(12) United States Patent
Sasaki

(10) Patent No.: US 6,459,543 B1
(45) Date of Patent: Oct. 1, 2002

(54) THIN-FILM MAGNETIC HEAD WITH HELICAL WOUND COIL

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 163 days.

(21) Appl. No.: 09/635,340

(22) Filed: Aug. 9, 2000

(30) Foreign Application Priority Data

Sep. 7, 1999 (JP) ............................................ 11-252537

(51) Int. Cl.$^7$ .............................................. G11B 5/147
(52) U.S. Cl. ..................................................... 360/126
(58) Field of Search ....................................... 360/126

(56) References Cited

U.S. PATENT DOCUMENTS

| | | | |
|---|---|---|---|
| 5,438,747 A | 8/1995 | Krounbi et al. | |
| 5,703,740 A | 12/1997 | Cohen et al. | |
| 5,969,911 A | * 10/1999 | Hikami | 360/126 |
| 6,275,354 B1 | * 8/2001 | Huai | 360/126 |

FOREIGN PATENT DOCUMENTS

| | | |
|---|---|---|
| JP | 48-55718 | 8/1973 |
| JP | 60-10409 | 1/1985 |
| JP | 60-113310 | 6/1985 |
| JP | 62-2455099 | 10/1987 |
| JP | 63-201908 | 8/1988 |
| JP | 7-262519 | 10/1995 |

* cited by examiner

Primary Examiner—A. J. Heinz
(74) Attorney, Agent, or Firm—Oliff & Berridge, PLC

(57) ABSTRACT

A recording head has a bottom pole layer and a top pole layer that include pole portions opposed to each other, a recording gap layer being placed between the pole portions. The recording head further has a thin-film coil helically wound around the top pole layer, a part of the coil passing between the top and bottom pole layers. The top pole layer has a pole portion layer and a yoke portion layer. The part of the coil is located on a side of the pole portion layer. The pole portion layer has a track portion, a coupling portion and a contact portion. The contact portion includes branch portions between which a throat height defining end is provided.

7 Claims, 30 Drawing Sheets

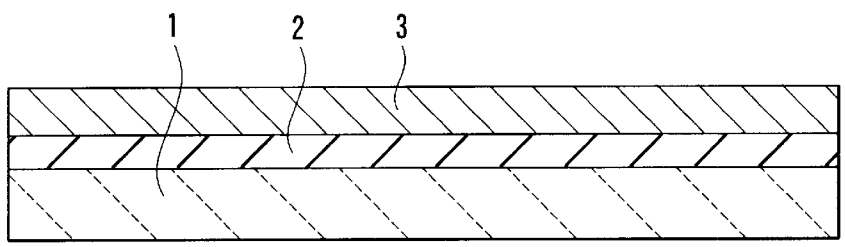 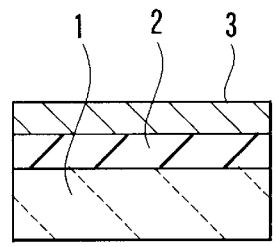
FIG. 1A  FIG. 1B
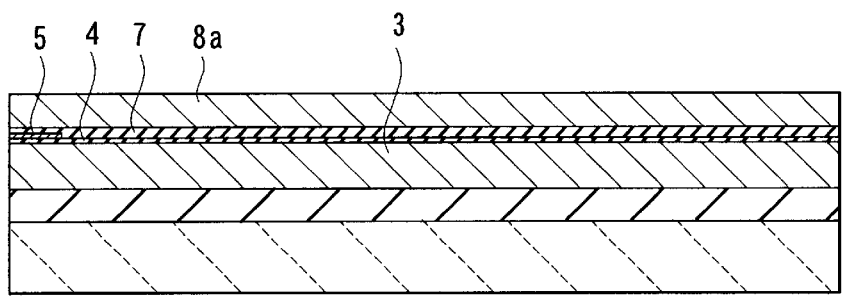 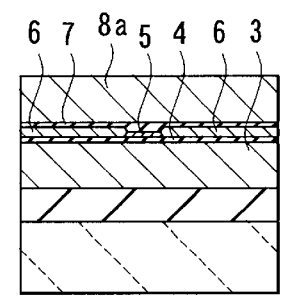
FIG. 2A  FIG. 2B

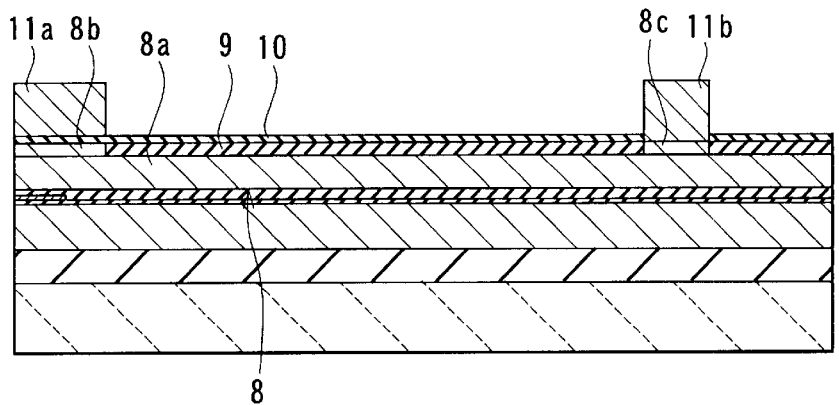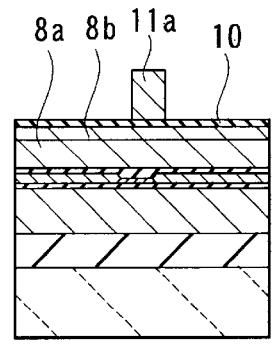
FIG. 3A  FIG. 3B
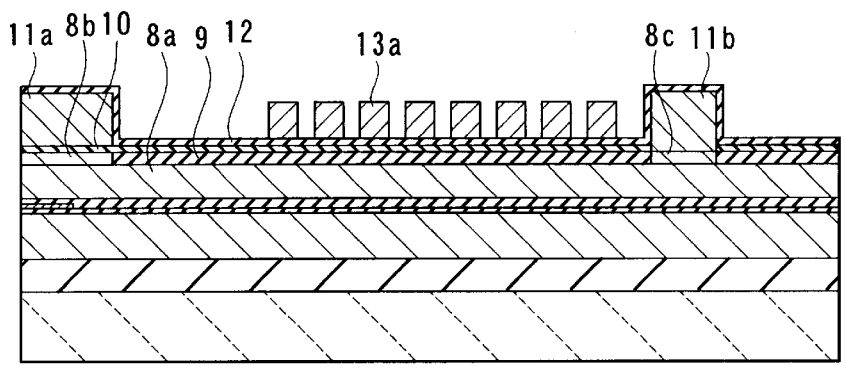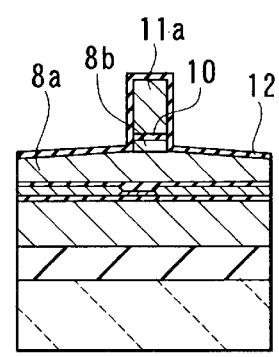
FIG. 4A  FIG. 4B

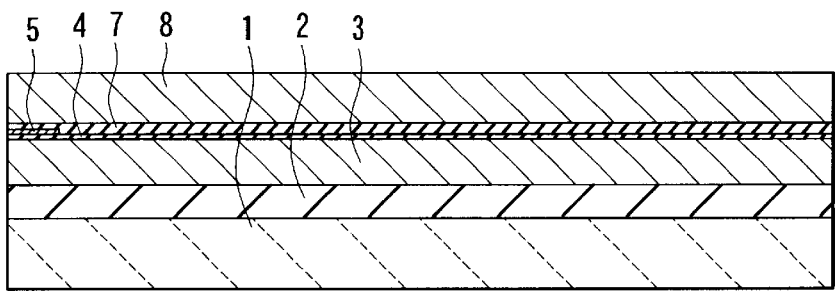 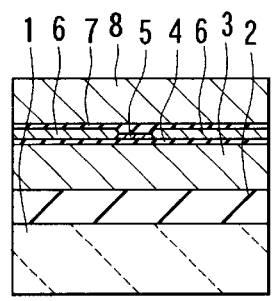
FIG. 23A                FIG. 23B
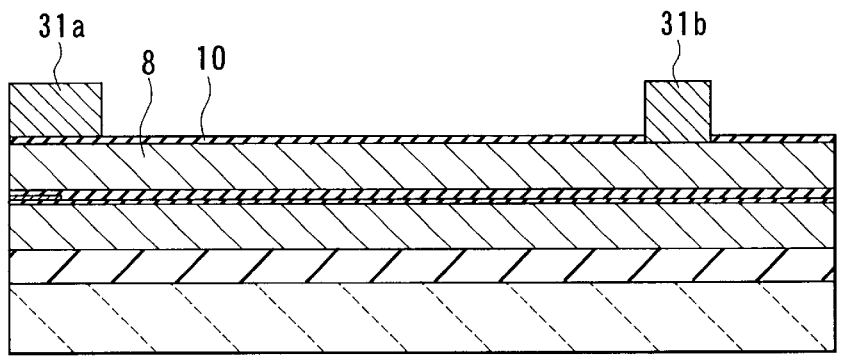 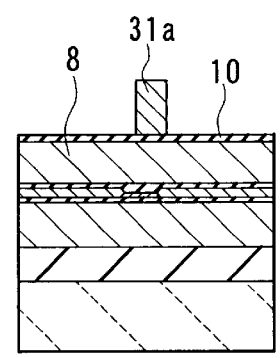
FIG. 24A                FIG. 24B

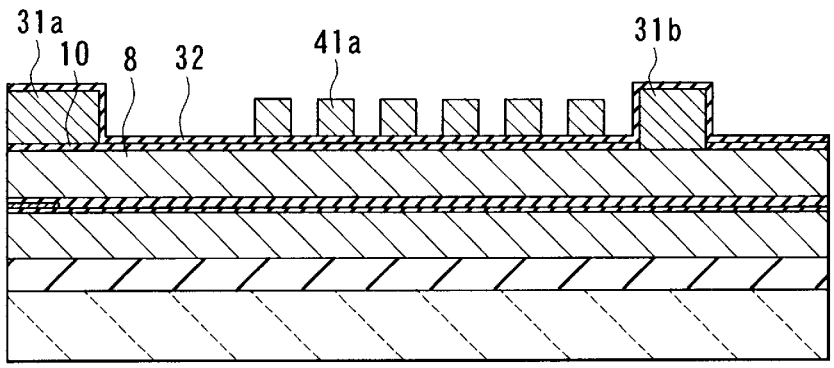 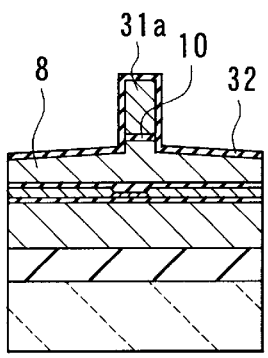
FIG. 25A  FIG. 25B
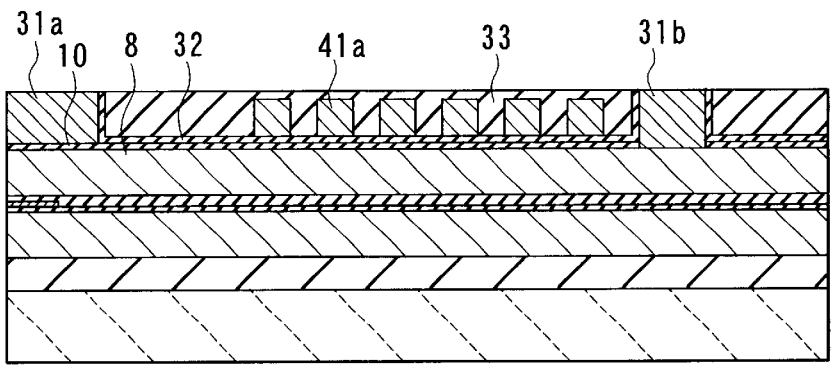 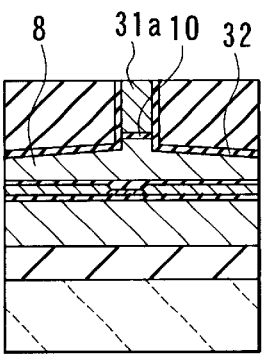
FIG. 26A  FIG. 26B

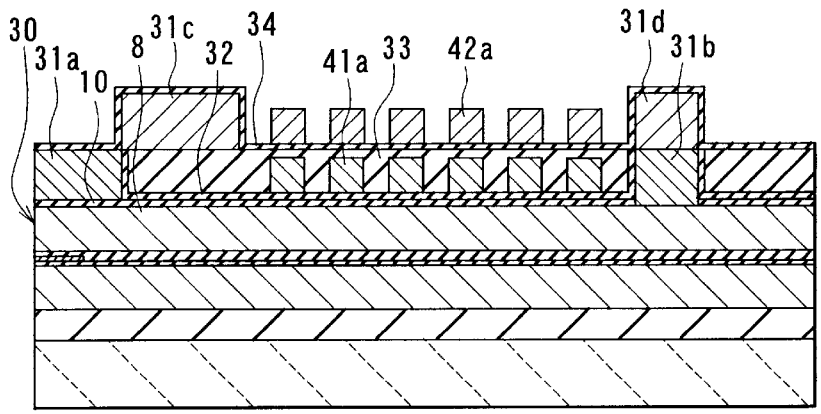
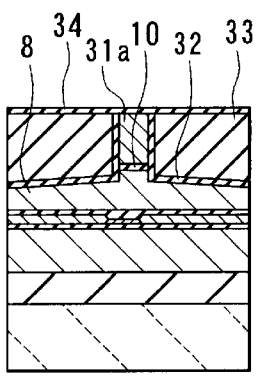
FIG. 27A                    FIG. 27B
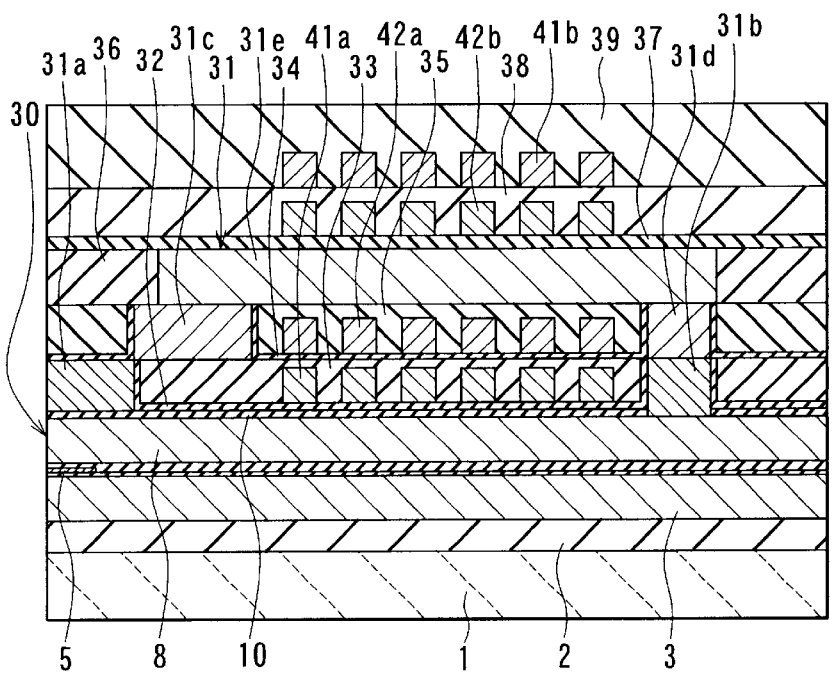
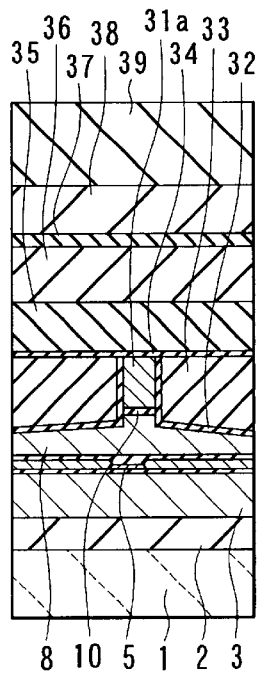
FIG. 28A                    FIG. 28B

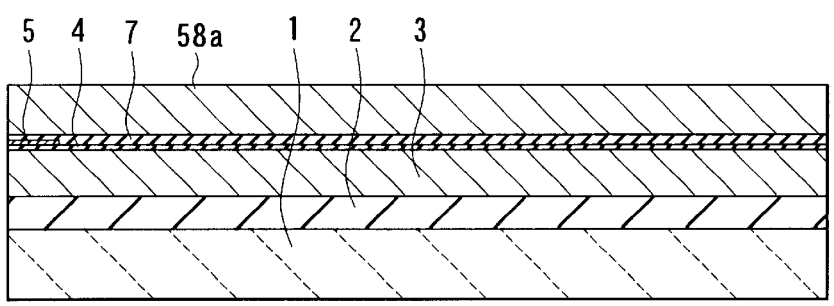 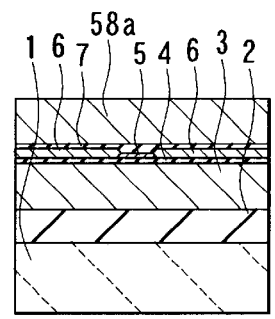
FIG. 32A FIG. 32B
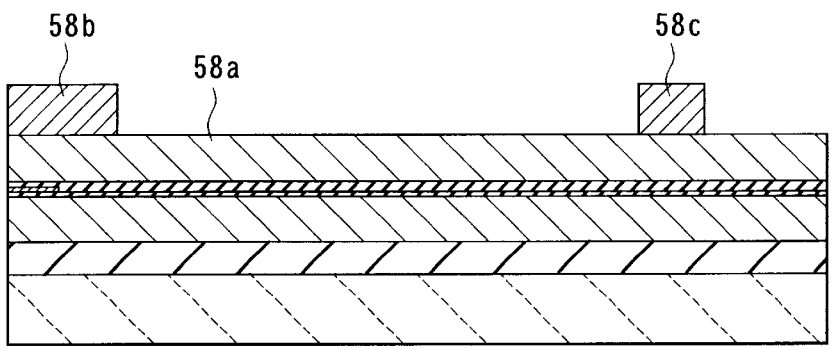 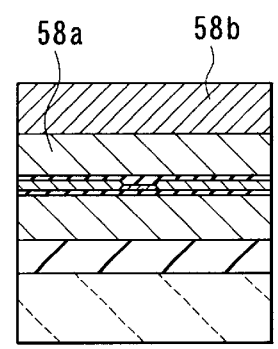
FIG. 33A FIG. 33B

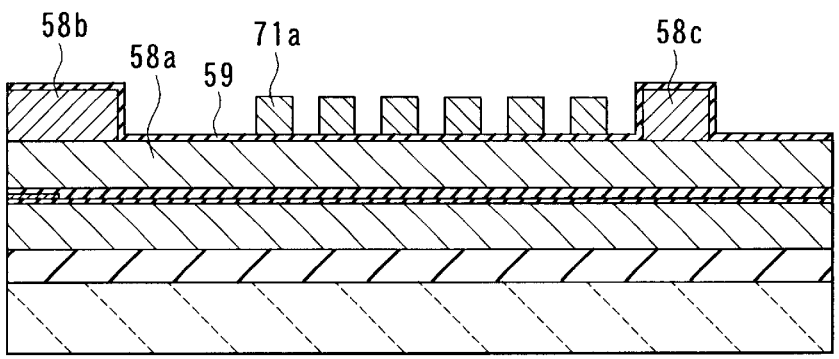 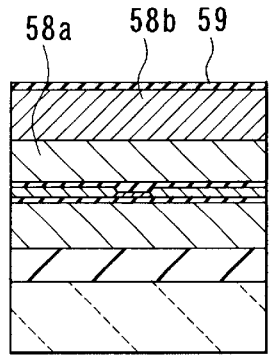
FIG. 34A                FIG. 34B
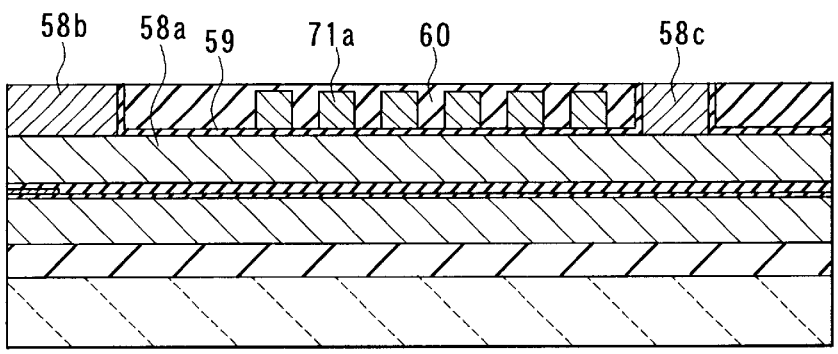 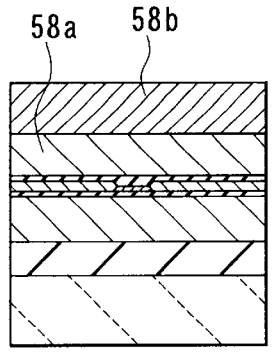
FIG. 35A                FIG. 35B

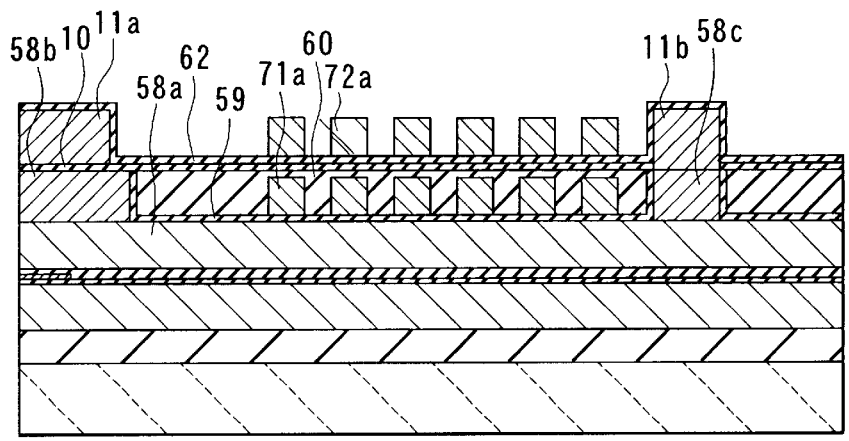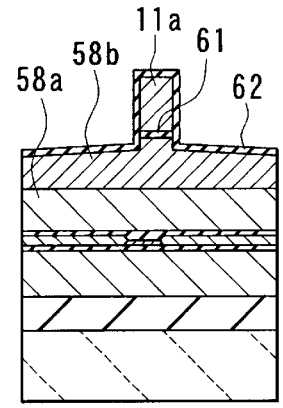
FIG. 36A  FIG. 36B
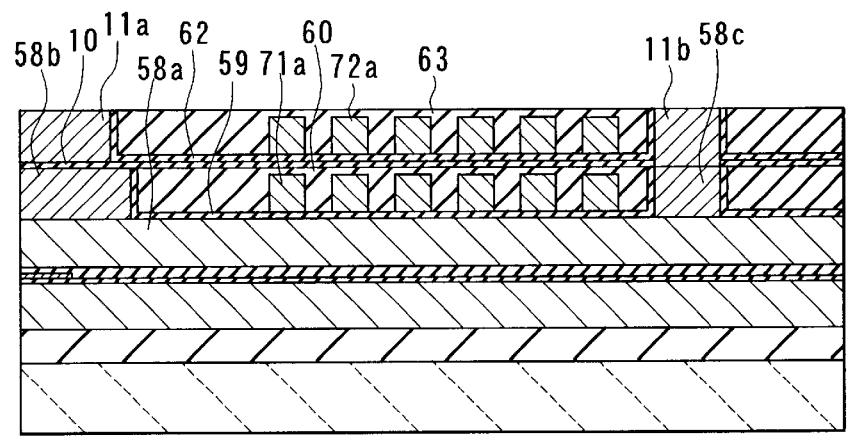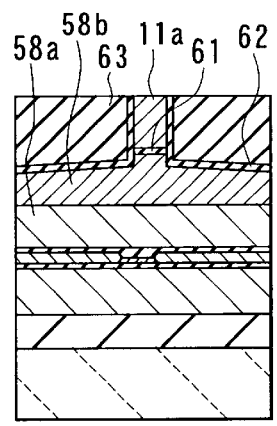
FIG. 37A  FIG. 37B

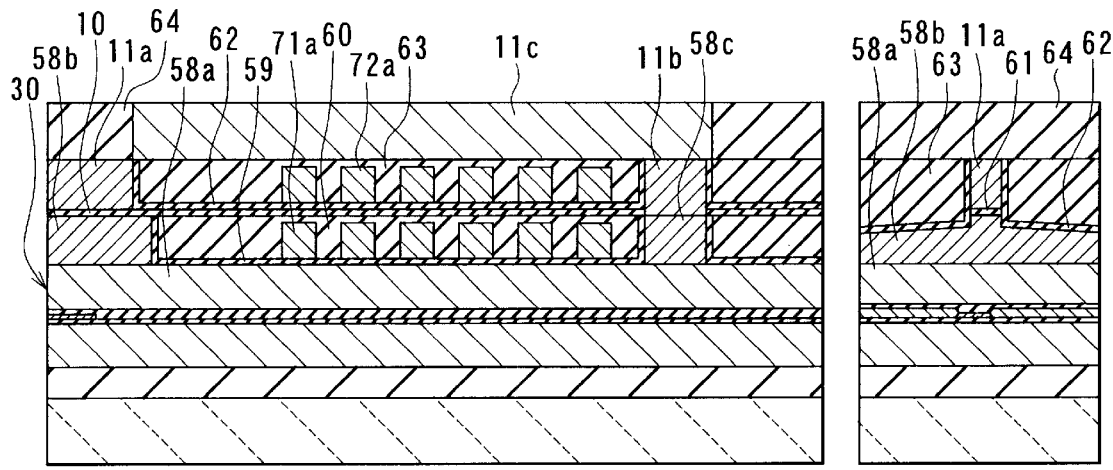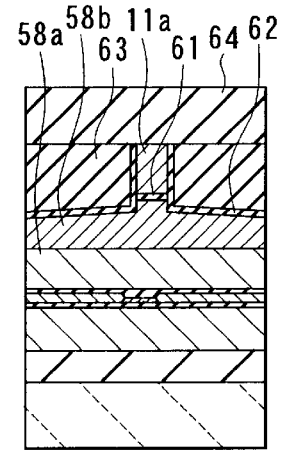
FIG. 38A  FIG. 38B
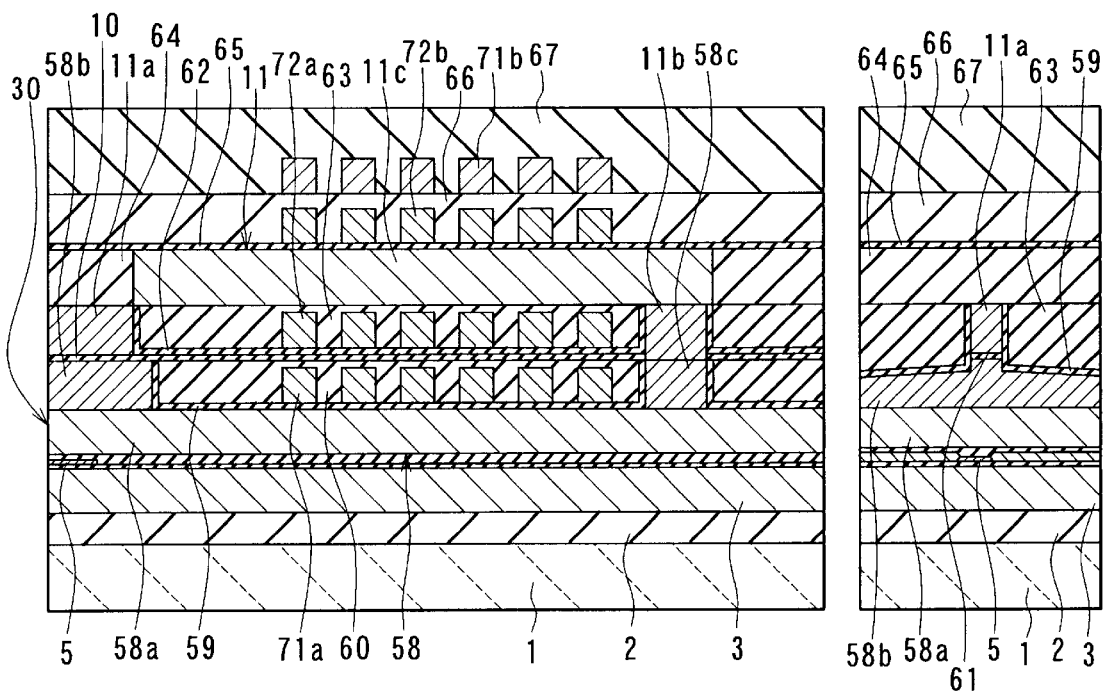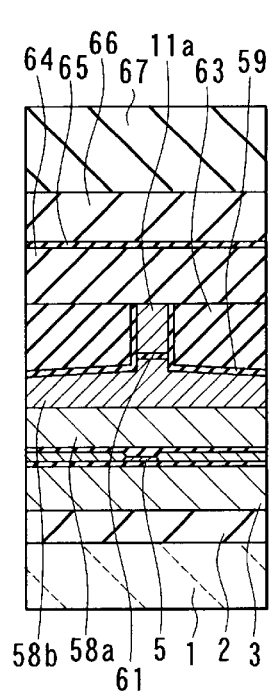
FIG. 39A  FIG. 39B

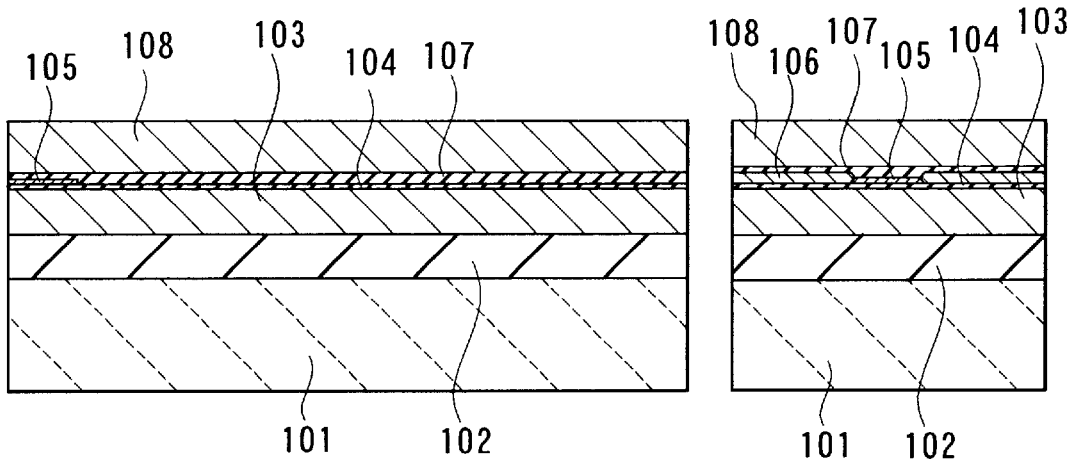
FIG. 40A
RELATED ART
FIG. 40B
RELATED ART
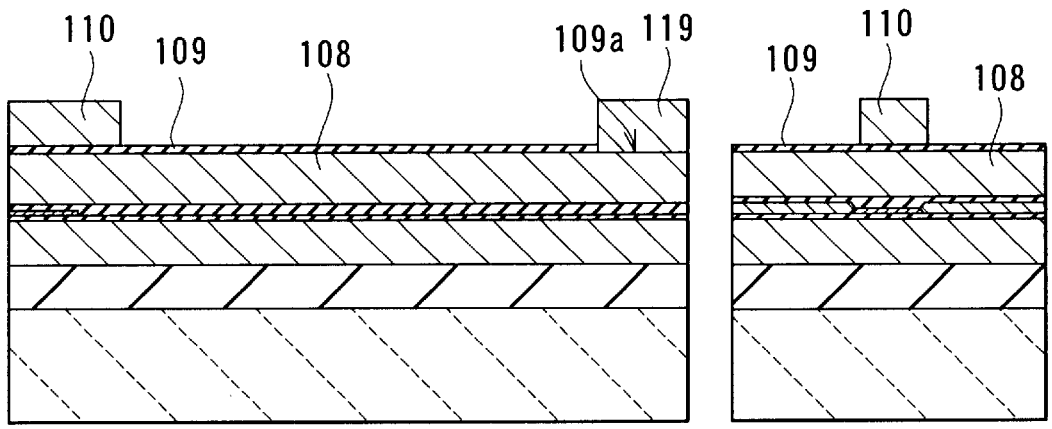
FIG. 41A
RELATED ART
FIG. 41B
RELATED ART

US 6,459,543 B1

THIN-FILM MAGNETIC HEAD WITH HELICAL WOUND COIL

BACKGROUND OF THE INVENTION

1. Field of the Invention

The present invention relates to a thin-film magnetic head comprising at least an induction-type magnetic transducer and a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to microns or the submicron order. Semiconductor process techniques are utilized to implement such a structure.

Reference is now made to FIG. 40A to FIG. 43A and FIG. 40B to FIG. 43B to describe an example of a method of manufacturing a composite thin-film magnetic head as an example of a related-art method of manufacturing a thin-film magnetic head. FIG. 40A to FIG. 43A are cross sections each orthogonal to the air bearing surface of the thin-film magnetic head. FIG. 40B to FIG. 43B are cross sections of a pole portion of the head each parallel to the air bearing surface.

In the manufacturing method, as shown in FIG. 40A and FIG. 40B, an insulating layer 102 made of alumina ($Al_2O_3$), for example, having a thickness of about 5 to 10 μm is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 as an insulating layer is formed on the bottom shield gap film 104 and the MR element 105. The MR element 105 is embedded in the shield gap films 104 and 107.

Next, a top-shield-layer-cum-bottom-pole-layer (called a bottom pole layer in the following description) 108 having a thickness of about 3 μm is formed on the top shield gap film 107. The bottom pole layer 108 is made of a magnetic material and used for both a reproducing head and a recording head.

Next, as shown in FIG. 41A and FIG. 41B, on the bottom pole layer 108, a recording gap layer 109 made of an insulating film such as an alumina film whose thickness is 0.2 μm is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 μm is formed for the recording head. At the same time, a magnetic layer 119 made of a magnetic material is formed for making the magnetic path in the contact hole 109a for making the magnetic path.

Next, as shown in FIG. 42A and FIG. 42B, the recording gap layer 109 and the bottom pole layer 108 are etched through ion milling, using the top pole tip 110 as a mask. As shown in FIG. 42B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of alumina, for example, and having a thickness of about 3 μm is formed on the entire surface. The insulating layer 111 is then polished to the surfaces of the top pole tip 110 and the magnetic layer 119, and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112 of the coil. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114 of the coil. Heat treatment is then performed at a specific temperature to flatten the surface of the photoresist layer 115.

Next, as shown in FIG. 43A and FIG. 43B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

FIG. 44 is a top view of the thin-film magnetic head shown in FIG. 43A and FIG. 43B, wherein the overcoat layer 117 and the other insulating layers and insulating films are omitted.

In FIG. 43A, 'TH' indicates the throat height and 'MR-H' indicates the MR height. The throat height is the length (height) of portions of two magnetic pole layers between the air-bearing-surface-side end and the other end, the portions facing each other with a recording gap layer in between. The MR height is the length (height) of the MR element between an end of the MR element located in the air bearing surface and the other end. In FIG. 43B, 'P2W' indicates the pole width, that is, the recording track width. In addition to the factors such as the throat height and the MR height, the apex angle as indicated with θ in FIG. 43A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 43A and FIG. 43B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer of small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern of the submicron order through the use of a photoresist film. Therefore, it is required to form a fine pattern of the submicron order on the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 41A to FIG. 43A and FIG. 41B to FIG. 43B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible to reduce the dimensions of the top pole tip 110 that defines the recording track width to some extent and to form the top pole tip 110 on the flat top surface of the recording gap layer 109.

However, the following problems (1) to (3) are still found in the thin-film magnetic head having a structure as shown in FIG. 43A and FIG. 43B.

(1) In the thin-film magnetic head shown in FIG. 43A and FIG. 43B, the recording track width and the throat height are defined by the top pole tip 110. Therefore, if the recording track width is extremely reduced, that is, down to 0.5 μm or less, in particular, the size of the top pole tip 110 is thus extremely reduced. As a result, pattern edges may be rounded and it is difficult to form the top pole tip 110 with accuracy. Therefore, the thin-film magnetic head having the structure as shown in FIG. 43A and FIG. 43B has a problem that it is difficult to precisely control the recording track width and the throat height if the recording track width is extremely reduced.

(2) In the thin-film magnetic head shown in FIG. 43A and FIG. 43B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicronorder width is required for the top pole layer 116, too. However, the top pole layer 116 is formed on top of the apex in the head shown in FIG. 43A and FIG. 43B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by this thin-film magnetic head on a side of the top pole layer 116, too, and so-called 'side write' may result, that is, data is written in a region of a recording medium where data is not supposed to be written, or so-called 'side erase' may result, that is, data is erased in a region of a recording medium where data is not supposed to be written. Such a problem more frequently results when the coil is two-layer or three-layer to improve the performance of the recording head and the apex is thereby increased in height, compared to the case where the coil is one-layer.

(3) In the thin-film magnetic head shown in FIG. 43A and FIG. 43B, the cross-sectional area of the magnetic path abruptly decreases in the portion in which the top pole layer 116 is in contact with the top pole tip 110. As a result, the magnetic flux is saturated in this portion. It is therefore impossible to utilize the magnetomotive force generated by the layers 112 and 114 of the coil for writing with efficiency.

Furthermore, in the prior-art thin-film magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of an end of the pole portion farther from the air bearing surface) and the outermost end of the coil increases, which is a major factor that prevents a reduction in yoke length. This problem will now be described in detail. Since the yoke length of a two-layer coil can be shorter than that of a single-layer coil, a two-layer coil is adopted to many of recording heads for high frequency application. However, in the prior-art magnetic head, after the first layer of the coil is formed, a photoresist film having a thickness of about 2 μm is formed to cover the first layer of the coil, so that neighboring ones of turns of the coil are insulated from each other. A rounded portion is formed near the outermost end of the photoresist layer that covers the first layer of the coil. A second layer of the coil is then formed on this photoresist layer. The second layer is required to be formed on a flat portion since it is impossible to etch the seed layer of the coil in the rounded portion near the outermost end of the photoresist layer, and the coil is thereby shorted.

Therefore, if the total coil thickness is 2 to 3 $\mu$m, the thickness of the photoresist layer insulating every neighboring ones of the turns of the coil is 2 $\mu$m, and the apex angle is 45 to 55 degrees, for example, the yoke length is required to be 6 to 8 $\mu$m which is twice as long as the distance between the outermost end of the coil and the neighborhood of the zero throat height position, that is, 3 to 4 $\mu$m (a distance of 3 to 4 $\mu$m is required, too, between the innermost end of the coil and the portion where the top and bottom pole layers are in contact with each other), in addition to the length of the portion corresponding to the coil. This length of the portion except the portion corresponding to the coil is one of the factors that prevent a reduction in yoke length.

Assuming that a two-layer eleven-turn coil wherein the line width is 1.2 $\mu$m and the space is 0.8 $\mu$m is fabricated, for example, the portion of the yoke length corresponding to the first layer 112 of the coil is 11.2 $\mu$m, if the first layer is made up of six turns and the second layer is made up of five turns, as shown in FIG. 43A and FIG. 43B. In addition to this length, the total of 6 to 8 $\mu$m, that is, the distance between each of the outermost and innermost ends of the first layer 112 of the coil and each of ends of the photoresist layer 113 for insulating the first layer 112, is required for the yoke length. Therefore, the yoke length is 17.2 to 19.2 $\mu$m. If a single-layer eleven-turn coil is fabricated, the yoke length is 27.2 to 29.2 $\mu$m. In the present application, the yoke length is the length of a portion of the pole layer except the pole portion and the contact portions, as indicated with $L_O$ in FIG. 43A. As thus described, it is difficult in the prior art to further reduce the yoke length, which prevents improvements in high frequency characteristic.

The thin-film magnetic head shown in FIG. 43A and FIG. 43B has a flat-whorl-shaped coil. In contrast, a thin-film magnetic head having a helical-shaped coil wound around the pole layer is disclosed in U. S. Pat. No. 5,703,740, Published Unexamined Japanese Patent Application Sho 48-55718 (1973), Published Unexamined Japanese Patent Application Sho 60-113310 (1985) and Published Unexamined Japanese Patent Application Sho 63-201908 (1988), for example. Such a structure of the helical-shaped coil allows the magnetomotive force generated by the coil to be supplied to the pole layer with efficiency. As a result, it is possible that the number of turns of the coil is smaller than that of a flat-whorl-shaped coil. The yoke length is thereby reduced.

However, such a prior-art head with a helical-shaped coil has an apex, too. Therefore, the foregoing problems resulting from the apex remain unsolved.

OBJECT AND SUMMARY OF THE INVENTION

It is an object of the invention to provide a thin-film magnetic head and a method of manufacturing the same for defining a track width and a throat height of an induction-type magnetic transducer with accuracy even when the track width is reduced, for achieving a reduction in yoke length, and for preventing writing of data in a region where data is not supposed to be written, and for preventing saturation of a magnetic flux halfway through the magnetic path.

Each of first to third thin-film magnetic heads of the invention comprises: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil wound around at least one of the magnetic layers in a helical manner and insulated from the first and second magnetic layers, a part of the coil passing between the first and second magnetic layers.

In the first thin-film magnetic head of the invention, one of the magnetic layers includes: a pole portion layer having a surface adjacent to the gap layer and including one of the pole portions; and a yoke portion layer connected to the other surface of the pole portion layer and making up a yoke portion. The part of the coil is located on a side of the pole portion layer. The yoke portion layer has an end face facing toward the medium facing surface, the end face being located at a distance from the medium facing surface. The pole portion layer includes: a track portion that defines a track width; a contact portion that is in direct or indirect contact with the yoke portion layer; and a coupling portion that couples the track portion and the contact portion to each other. The contact portion includes a plurality of branch portions that branch off from the coupling portion. The coupling portion has an end located between the branch portions and located opposite to the medium facing surface, the end defining a throat height.

According to the first thin-film magnetic head of the invention, the thin-film coil is wound around at least one of the magnetic layers in a helical manner, and a part of the coil passes between the first and second magnetic layers. In addition, the part of the coil is placed on a side of the pole portion layer of one of the magnetic layers. As a result, a reduction in the yoke length is achieved. Furthermore, the pole portion layer is formed on the flat surface, and it is thereby possible to define the track width and the throat height with accuracy. According to the first thin-film magnetic head of the invention, an end face of the yoke portion layer of the one of the magnetic layers facing toward the medium facing surface is located at a distance from the medium facing surface. The contact portion of the pole portion layer includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

The first thin-film magnetic head of the invention may further comprise an insulating layer that covers the part of the coil located on the side of the pole portion layer, the insulating layer having a surface that faces the yoke portion layer and is flattened. The first thin-film magnetic head may further comprise a flux blocking layer for blocking the passage of a magnetic flux, the flux blocking layer being located between the contact portion of the pole portion layer and the other of the magnetic layers.

According to the second thin-film magnetic head of the invention, one of the magnetic layers includes: a pole portion layer having a surface adjacent to the gap layer and including one of the pole portions; a yoke portion layer making up a yoke portion; and an intermediate layer having a surface connected to the other surface of the pole portion layer, and the other surface connected to the yoke portion layer. The thin-film coil includes: a first portion a part of which is located on a side of the pole portion layer; and a second portion a part of which is located on a side of the intermediate layer. Each of the intermediate layer and the yoke portion layer has an end face facing toward the medium facing surface, the end face being located at a distance from the medium facing surface. The pole portion layer includes: a track portion that defines a track width; a contact portion that is in contact with the intermediate layer; and a coupling portion that couples the track portion and the contact portion to each other. The contact portion includes a plurality of branch portions that branch off from the coupling portion. The coupling portion has an end located between the branch portions and located opposite to the medium facing surface, the end defining a throat height.

According to the second thin-film magnetic head of the invention, the thin-film coil is wound around at least one of the magnetic layers in a helical manner, and includes: the first portion a part of which is located on a side of the pole portion layer; and the second portion a part of which is located on a side of the intermediate layer. As a result, a reduction in the yoke length is achieved. Furthermore, the pole portion layer is formed on the flat surface, and it is thereby possible to define the track width and the throat height with accuracy. According to the second thin-film magnetic head of the invention, each of the intermediate layer and the yoke portion layer of one of the magnetic layers has an end face facing toward the medium facing surface, the end face being located at a distance from the medium facing surface. The contact portion of the pole portion layer includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

The second thin-film magnetic head of the invention may further comprise: a first insulating layer that covers the part of the first portion of the coil located on the side of the pole portion layer, the first insulating layer having a surface that faces the intermediate layer and is flattened; and a second insulating layer that covers the part of the second portion of the coil located on the side of the intermediate layer, the second insulating layer having a surface that faces the yoke portion layer and is flattened.

According to the third thin-film magnetic head of the invention, each of the first and second magnetic layers includes: a pole portion layer having a surface adjacent to the gap layer and including one of the pole portions; and a yoke portion layer connected to the other surface of the pole portion layer and making up a yoke portion. The thin-film coil includes: a first portion a part of which is located on a side of the pole portion layer of the first magnetic layer; and a second portion a part of which is located on a side of the pole portion layer of the second magnetic layer. The yoke portion layer of one of the magnetic layers has an end face facing toward the medium facing surface, the end face being located at a distance from the medium facing surface. The pole portion layer of the one of the magnetic layers includes: a track portion that defines a track width; a contact portion that is in contact with the yoke portion layer; and a coupling portion that couples the track portion and the contact portion to each other. The contact portion includes a plurality of branch portions that branch off from the coupling portion; and the coupling portion has an end located between the branch portions and located opposite to the medium facing surface, the end defining a throat height.

According to the third thin-film magnetic head of the invention, the thin-film coil is wound around at least one of the magnetic layers in a helical manner, and includes: the first portion a part of which is located on a side of the pole portion layer of the first magnetic layer; and the second portion a part of which is located on a side of the pole portion layer of the second magnetic layer. As a result, a reduction in the yoke length is achieved. Furthermore, the pole portion layer of one of the magnetic layers is formed on the flat surface, and it is thereby possible to define the track width and the throat height with accuracy. According to the third thin-film magnetic head of the invention, the yoke portion layer of one of the magnetic layers has an end face facing toward the medium facing surface, the end face being located at a distance from the medium facing surface. The contact portion of the pole portion layer of the one of the magnetic layers includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

The third thin-film magnetic head of the invention may further comprise: a first insulating layer that covers the part of the first portion of the coil located on the side of the pole portion layer of the first magnetic layer, the first insulating layer having a surface that faces the gap layer and is flattened; and a second insulating layer that covers the part of the second portion of the coil located on the side of the pole portion layer of the second magnetic layer, the second insulating layer having a surface that faces the yoke portion layer and is flattened.

Each of first to third methods of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions on a side of the medium facing surface, each of the magnetic layers including at least one layer; a gap layer provided between the pole portions of the first and second magnetic layers; and a thin-film coil insulated from the first and second magnetic layers, a part of the coil passing between the first and second magnetic layers. Each of the methods includes the steps of: forming the first magnetic layer; forming the gap layer on the first magnetic layer; forming the second magnetic layer on the gap layer; and forming the coil such that the coil is wound around at least one of the magnetic layers in a helical manner and insulated from the first and second magnetic layers, the part of the coil passing between the first and second magnetic layers.

According to the first method of the invention, the step of forming one of the magnetic layers includes the steps of forming a pole portion layer having a surface adjacent to the gap layer and including one of the pole portions; and forming a yoke portion layer connected to the other surface of the pole portion layer and making up a yoke portion. The part of the coil is located on a side of the pole portion layer in the step of forming the coil. In the step of forming the yoke portion layer, the yoke portion layer is formed to have an end face facing toward the medium facing surface, the end face being located at a distance from the medium facing surface. In the step of forming the pole portion layer, the pole portion layer is formed such that: the pole portion layer includes: a track portion that defines a track width; a contact portion that is in direct or indirect contact with the yoke portion layer; and a coupling portion that couples the track portion and the contact portion to each other; the contact portion includes a plurality of branch portions that branch off from the coupling portion; the coupling portion has an end located between the branch portions and located opposite to the medium facing surface, the end defining a throat height.

According to the first method of the invention, the one of the magnetic layers may be the second magnetic layer, and the method may further include the step of forming an insulating layer that covers the part of the coil located on the side of the pole portion layer, the insulating layer having a surface that faces the yoke portion layer and is flattened. The first method may further include the step of forming a flux blocking layer for blocking the passage of a magnetic flux, the flux blocking layer being located between the contact portion of the pole portion layer and the other of the magnetic layers.

According to the second method of the invention, the step of forming one of the magnetic layers includes the steps of: forming a pole portion layer having a surface adjacent to the gap layer and including one of the pole portions; forming a yoke portion layer forming a yoke portion; and forming an intermediate layer having a surface connected to the other surface of the pole portion layer, and the other surface connected to the yoke portion layer. The step of forming the coil includes formation of a first portion a part of which is located on a side of the pole portion layer; and a second portion a part of which is located on a side of the intermediate layer. In the steps of forming the intermediate layer and forming the yoke portion layer, each of the intermediate layer and the yoke portion layer is formed to have an end face facing toward the medium facing surface, the end face being located at a distance from the medium facing surface. In the step of forming the pole portion layer, the pole portion layer is formed such that: the pole portion layer includes: a track portion that defines a track width; a contact portion that is in contact with the intermediate layer; and a coupling portion that couples the track portion and the contact portion to each other; the contact portion includes a plurality of branch portions that branch off from the coupling portion; and the coupling portion has an end located between the branch portions and located opposite to the medium facing surface, the end defining a throat height.

According to the second method of the invention, the one of the magnetic layers may be the second magnetic layer, and the method may further include the steps of forming a first insulating layer that covers the part of the first portion of the coil located on the side of the pole portion layer, the first insulating layer having a surface that faces the intermediate layer and is flattened; and forming a second insulating layer that covers the part of the second portion of the coil located on the side of the intermediate layer, the second insulating layer having a surface that faces the yoke portion layer and is flattened.

According to the third method of the invention, each of the steps of forming the first magnetic layer and forming the second magnetic layer includes the steps of: forming a pole portion layer having a surface adjacent to the gap layer and including one of the pole portions; and forming a yoke portion layer connected to the other surface of the pole portion layer and forming a yoke portion. The step of forming the coil includes formation of: a first portion a part of which is located on a side of the pole portion layer of the first magnetic layer; and a second portion a part of which is located on a side of the pole portion layer of the second magnetic layer. In the step of forming the yoke portion layer of one of the magnetic layers, the yoke portion layer is formed to have an end face facing toward the medium facing surface, the end face being located at a distance from the medium facing surface. In the step of forming the pole portion layer of the one of the magnetic layers, the pole portion layer is formed such that: the pole portion layer includes: a track portion that defines a track width; a contact portion that is in contact with the yoke portion layer; and a coupling portion that couples the track portion and the contact portion to each other; the contact portion includes a plurality of branch portions that branch off from the coupling portion; and the coupling portion has an end located between the branch portions and located opposite to the medium facing surface, the end defining a throat height.

The third method of the invention may further include the steps of: forming a first insulating layer that covers the part of the first portion of the coil located on the side of the pole portion layer of the first magnetic layer, the first insulating layer having a surface that faces the gap layer and is flattened; and forming a second insulating layer that covers the part of the second portion of the coil located on the side of the pole portion layer of the second magnetic layer, the second insulating layer having a surface that faces the yoke portion layer and is flattened.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 23A and FIG. 23B are cross sections for illustrating a step in a method of manufacturing a thin-film magnetic head of a ninth embodiment of the invention.

FIG. 24A and FIG. 24B are cross sections for illustrating a step that follows FIG. 23A and FIG. 23B.

FIG. 25A and FIG. 25B are cross sections for illustrating a step that follows FIG. 24A and FIG. 24B.

FIG. 26A and FIG. 26B are cross sections for illustrating a step that follows FIG. 25A and FIG. 25B.

FIG. 27A and FIG. 27B are cross sections for illustrating a step that follows FIG. 26A and FIG. 26B.

FIG. 28A and FIG. 28B are cross sections of the thin-film magnetic head of the ninth embodiment.

FIG. 32A and FIG. 32B are cross sections for illustrating a step in a method of manufacturing a thin-film magnetic head of a twelfth embodiment of the invention.

FIG. 33A and FIG. 33B are cross sections for illustrating a step that follows FIG. 32A and FIG. 32B.

FIG. 34A and FIG. 34B are cross sections for illustrating a step that follows FIG. 33A and FIG. 33B.

FIG. 35A and FIG. 35B are cross sections for illustrating a step that follows FIG. 34A and FIG. 34B.

FIG. 36A and FIG. 36B are cross sections for illustrating a step that follows FIG. 35A and FIG. 35B.

FIG. 37A and FIG. 37B are cross sections for illustrating a step that follows FIG. 36A and FIG. 36B.

FIG. 38A and FIG. 38B are cross sections for illustrating a step that follows FIG. 37A and FIG. 37B.

FIG. 39A and FIG. 39B are cross sections of the thin-film magnetic head of the twelfth embodiment.

FIG. 40A and FIG. 40B are cross sections for illustrating a step in a method of manufacturing a thin-film magnetic head of related art.

FIG. 41A and FIG. 41B are cross sections for illustrating a step that follows FIG. 40A and FIG. 40B.

DETAILED DESCRIPTION OF THE PREFERRED EMBODIMENTS

Figures 5A, 5B:
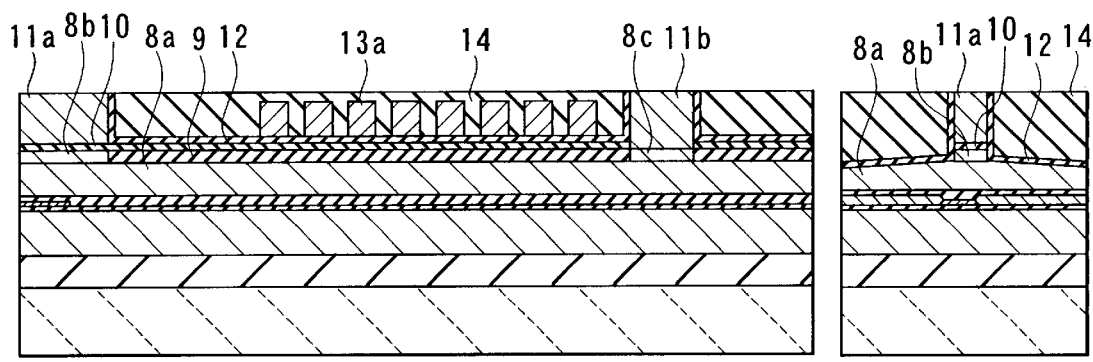
FIG. 5A and FIG. 5B are cross sections for illustrating a step that follows FIG. 4A and FIG. 4B.

Preferred embodiments of the invention will now be described in detail with reference to the accompanying drawings.

[First Embodiment]

Reference is now made to FIG. 1A to FIG. 6A, FIG. 1B to FIG. 6B, and FIG. 7 to FIG. 9 to describe a thin-film magnetic head and a method of manufacturing the same of a first embodiment of the invention. FIG. 1A to FIG. 6A are cross sections each orthogonal to an air bearing surface. FIG. 1B to FIG. 6B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are formed through CVD, materials used are trimethyl aluminum (Al(CH)) and $H_2O$, for example. Through the use of CVD, it is possible to make the thin and precise shield gap films 4 and 7 with few pinholes.

Next, on the top shield gap film 7, a first layer 8a of a top-shield layer-cum-bottom-pole-layer (called a bottom pole layer in the following description) 8 having a thickness of about 2 to 3 $\mu$m is selectively formed. The bottom pole layer 8 is made of a magnetic material and used for both a reproducing head and a recording head. The bottom pole layer 8 is made up of a second layer 8b and a third layer 8c described later, in addition to the first layer 8a. The first layer 8a is located to face at least a part of a thin-film coil described later.

Next, as shown in FIG. 3A and FIG. 3B, the second layer 8b and the third layer 8c of the bottom pole layer 8, each having a thickness of about 1 to 2 μm, are formed on the first layer 8a. The second layer 8b includes a portion that makes up a pole portion of the bottom pole layer 8 and is connected to a surface of the first layer 8a that faces toward the thin-film coil (on the upper side of the drawings). The third layer 8c is provided for connecting the first layer 8a to a top pole layer described later.

Next, an insulating layer 9 having a thickness of about 2 to 3 μm is formed over the entire surface. The insulating layer 9 is made of an inorganic insulating material such as alumina or silicon dioxide. The insulating layer 9 is polished through CMP, for example, so that the second layer 8b and the third layer 8c of the bottom pole layer 8 are exposed and the thickness of the entire bottom pole layer 8 is made 2.5 to 3.5 μm. The surface is thus flattened.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering, and then selectively etched through ion milling, for example, and formed into the specific shapes. Alternatively, a material such as CoFe or a Co-base amorphous material as a high saturation flux density material may be used.

Next, a recording gap layer 10 made of an insulating material whose thickness is 0.15 to 0.3 μm, for example, is formed on the second layer 8b and the third layer 8c of the bottom pole layer 8 and the insulating layer 9. In general, the insulating material used for the recording gap layer 10 may be alumina, aluminum nitride, a silicon-dioxide-base material, a silicon-nitride-base material, or diamond-like carbon (DLC) and so on. The recording gap layer 10 may be fabricated through sputtering or CVD. If the recording gap layer 10 made of an alumina film is formed through CVD, materials used are trimethyl aluminum ($Al(CH_3)_3$) and $H_2O$, for example. Through the use of CVD, it is possible to make the thin and precise recording gap layer 10 with few pinholes.

Next, a portion of the recording gap layer 10 located on top of the third layer 8c of the bottom pole layer 8 is etched to form a contact hole for making the magnetic path.

Next, on the recording gap layer 10, a pole portion layer 11a including a pole portion of the top pole layer 11 is formed. The pole portion layer 11a has a thickness of 2 to 4 μm, for example. At the same time, a magnetic layer 11b having a thickness of 2 to 4 μm is fabricated in the contact hole formed in a portion on top of the third layer 8c of the bottom pole layer 8. The top pole layer 11 of this embodiment is made up of the pole portion layer 11a, the magnetic layer 11b and a yoke portion layer 11c described later. The magnetic layer 11b is provided for connecting the yoke portion layer 11c to the third layer 8c of the bottom pole layer 8.

The pole portion layer 11a and the magnetic layer 11b of the top pole layer 11 may be made of NiFe (80 weight % Ni and 20 weight % Fe), or NiFe (45 weight % Ni and 55 weight % Fe) as a high saturation flux density material through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 4A and FIG. 4B, the recording gap layer 10 is selectively etched through dry etching, using the pole portion layer 11a of the top pole layer 11 as a mask. This dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by a depth of only 0.2 to 0.5 μm, for example, through argon ion milling, for example. A trim structure as shown in FIG. 4B is thus formed. The trim structure suppresses an increase in the effective track width due to expansion of a magnetic flux generated during writing in a narrow track.

Next, an insulating film 12 of alumina, for example, is formed over the entire surface. The thickness of the insulating film 12 is about 0.3 to 0.6 μm.

Next, on a portion of the insulating film 12 between the pole portion layer 11a and the magnetic layer 11b, a photoresist is patterned through a photolithography process to form a frame (not shown) used for making a first layer of the thin-film coil through frame plating. Next, the first layer 13a of the thin-film coil 13 made of copper (Cu), for example, is formed by frame plating through the use of the frame. For example, the thickness of the first layer 13a is 1 to 2 μm. The thin-film coil 13 of this embodiment is made up of the first layer 13a, and a second layer 13b and a coupling portion 13c described later. The frame is then removed. The first layer 13a is located on a side of the pole portion layer 11a of the top pole layer 11 (that is, on the right side of FIG. 4A). The first layer 13a is made up of a plurality of square-prism-shaped portions extending in the direction intersecting the drawing sheet of FIG. 4A.

Next, as shown in FIG. 5A and FIG. 5B, an insulating layer 14 of alumina, for example, having a thickness of about 3 to 4 μm is formed over the entire surface. The insulating layer 14 is then polished through CMP, for example, until the pole portion layer 11a and the magnetic layer 11b of the top pole layer 11 are exposed, and the surface is flattened. Although the first layer 13a of the coil 13 is not exposed in FIG. 5A, the first layer 13a may be exposed.

Figures 6A, 6B:
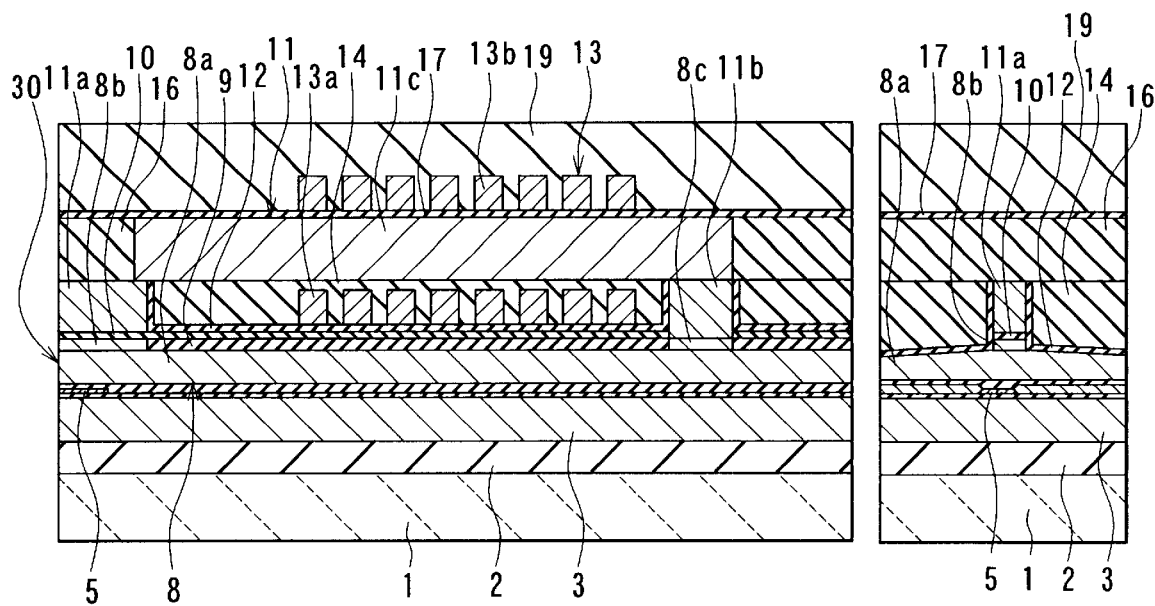
FIG. 6A and FIG. 6B are cross sections of the thin-film magnetic head of the first embodiment.

Next, as shown in FIG. 6A and FIG. 6B, the yoke portion layer 11c having a thickness of 2 to 3 μm, for example, is formed on the pole portion layer 11a and the magnetic layer 11b of the top pole layer 11 flattened and the insulating layer 14. The yoke portion layer 11c provided for the recording head is made of a magnetic material and forms a yoke portion of the top pole layer 11. The yoke portion layer 11c is in contact and magnetically coupled to the third layer 8c of the bottom pole layer 8 through the magnetic layer 11b. The yoke portion layer 11c may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 11c may be made of a number of layers of inorganic insulating films and magnetic layers of Permalloy, for example.

In this embodiment an end face of the yoke portion layer 11c facing toward the air bearing surface 30 is located at a distance from the air bearing surface 30 (that is, on the right side of FIG. 6A).

Next, an insulating layer 16 of alumina, for example, having a thickness of about 3 to 4 μm is formed over the entire surface. The insulating layer 16 is then polished through CMP, for example, so that the yoke portion layer 11c of the top pole layer 11 is exposed, and the surface is flattened. Next, an insulating film 17 of alumina, for example, having a thickness of about 0.3 to 0.5 μm is formed over the entire surface.

Next, although not shown, contact holes are formed through RIE or ion milling, for example, in portions on top of both ends of each of the square-prism-shaped portions of the first layer 13a of the coil 13. Those contact holes penetrate the insulating film 17 and the insulating layer 14, and reach the first layer 13a.

Next, the second layer 13b of the thin-film coil 13 made of copper (Cu), for example, is formed by frame plating on a portion of the insulating film 17 located on top of the yoke portion layer 11c of the top pole layer 11. For example, the thickness of the second layer 13b is about 1 to 2 μm. The second layer 13b is made up of a plurality of square-prism-shaped portions extending in the direction orthogonal to the drawing sheet of FIG. 6A. Both ends of each of the square-prism-shaped portions of the second layer 13b of the coil 13 are connected to both ends of each of the square-prism-shaped portions of the first layer 13a through coupling portions made of the above-described contact holes filled with the material of the thin-film coil.

Next, an overcoat layer 19 of alumina, for example, having a thickness of 20 to 40 μm, for example, is formed over the entire surface. The surface of the overcoat layer 19 is then flattened and pads (not shown) for electrodes are formed on the overcoat layer 19. Finally, lapping of the slider is performed to form the air bearing surface 30 of the thin-film magnetic head including the recording head and the reproducing head. The thin-film magnetic head of the embodiment is thus completed.

Figure 7:
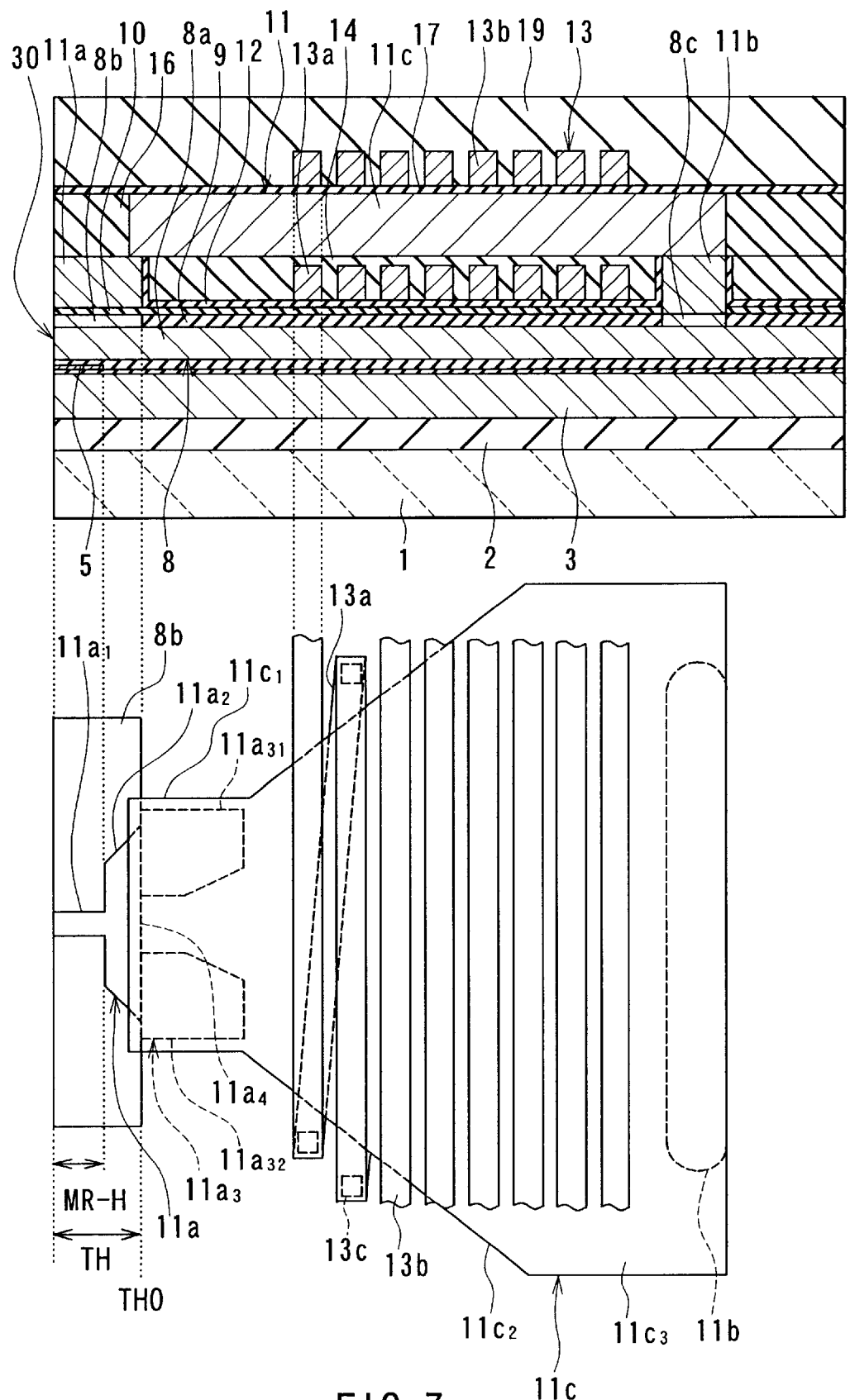
FIG. 7 is an explanatory view for illustrating the relationship between a cross-sectional view of the thin-film magnetic head of the first embodiment and a top view of the main part of the head.

FIG. 7 is an explanatory view for illustrating the relationship between a cross-sectional view (an upper view of FIG. 7) of the thin-film magnetic head of the embodiment and a top view (a lower view of FIG. 7) of the main part of the head. In FIG. 7 'TH' indicates the throat height, 'THO' indicates the zero throat height position, and 'MR-H' indicates the MR height.

Figure 8:
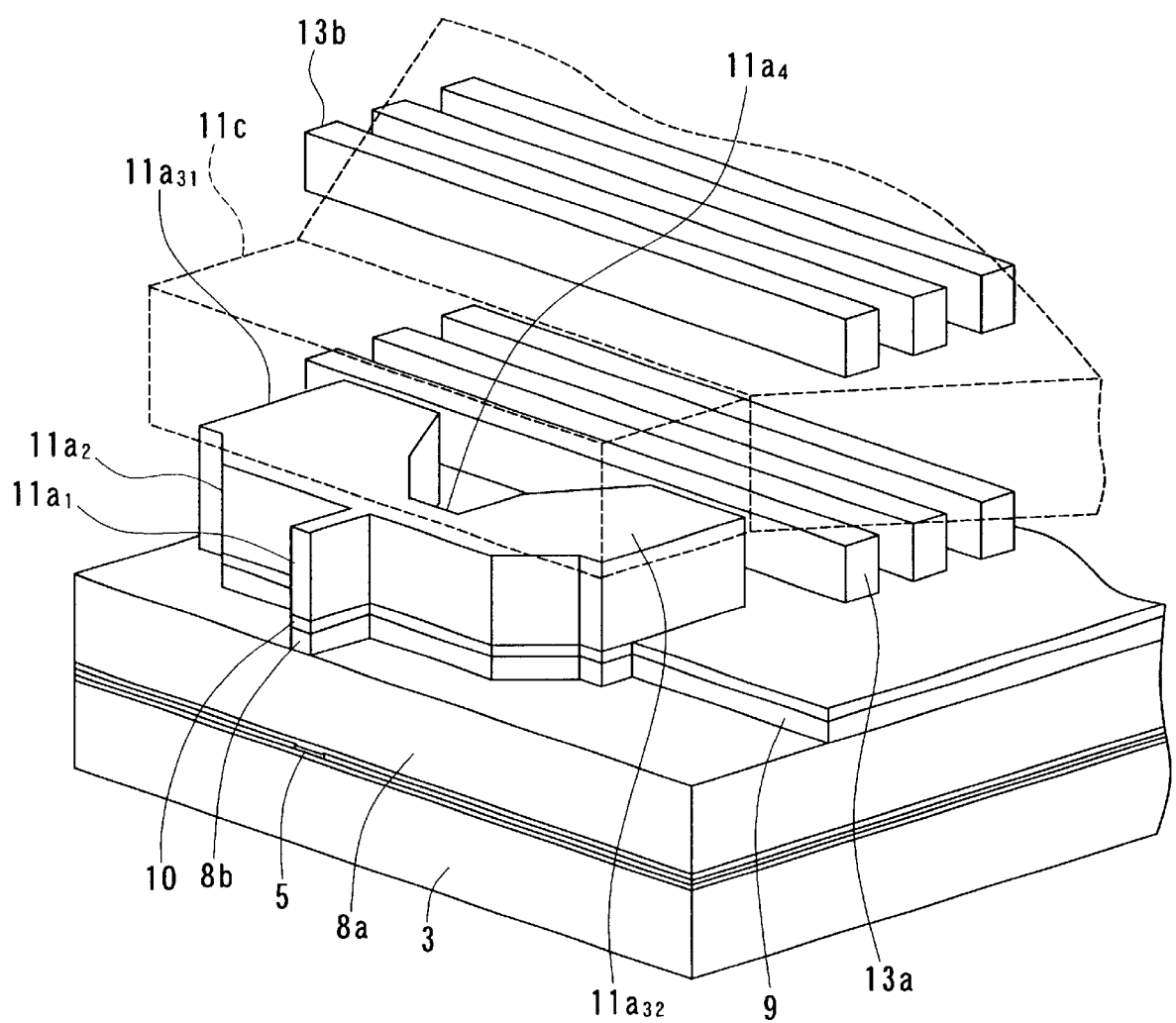
FIG. 8 is a perspective view of the main part of the thin-film magnetic head of the first embodiment.

FIG. 8 is a perspective view of the main part of the thin-film magnetic head of the embodiment, wherein the yoke portion layer 11c of the top pole layer 11 is shown with a broken line for convenience.

Figure 9:
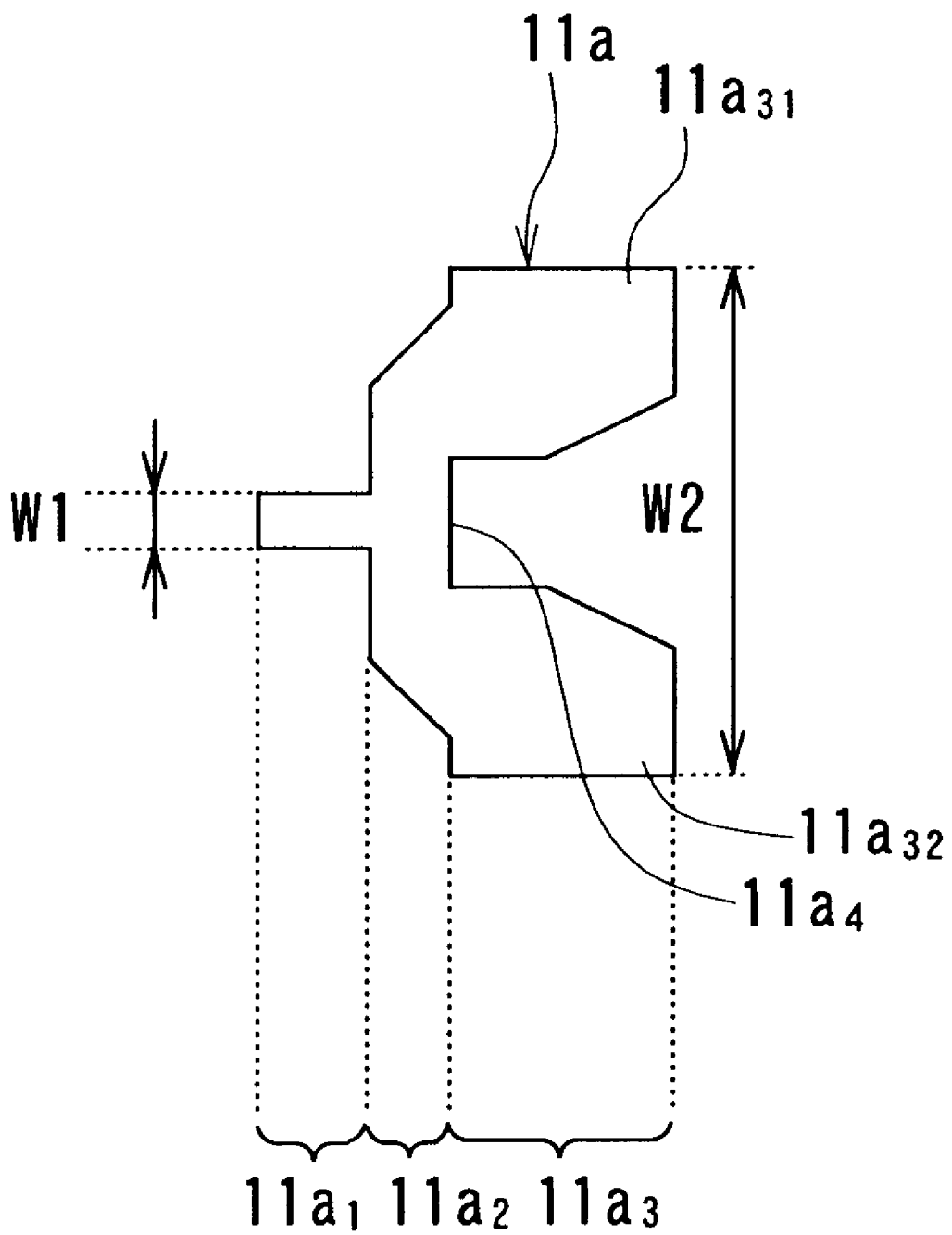
FIG. 9 is a top view of the pole portion layer of the top pole layer of the thin-film magnetic head of the first embodiment.

FIG. 9 is a top view of the pole portion layer 11a of the top pole layer 11. As shown, the pole portion layer 11a includes: a track portion $11a_1$ that defines recording track width W1; a contact portion $11a_3$ that is in contact with the yoke portion layer 11c; and a coupling portion $11a_2$ that couples the track portion $11a_1$ to the contact portion $11a_3$. The contact portion $11a_3$ includes two branch portions $11a_{31}$ and $11a_{32}$ that branch off from the coupling portion $11a_2$. The coupling portion $11a_2$ has an end $11a_4$ located between the branch portions $11a_{31}$ and $11a_{32}$ and located farther from the air bearing surface 30. This end $11a_4$ has the shape of a straight line parallel to the air bearing surface 30. In this embodiment, as shown in FIG. 7, the end $11a_4$ defines throat height TH. That is, the position of the end $11a_4$ is zero throat height position THO. The end $11a_4$ may be hereinafter called a throat height defining end. The entire width W2 of the contact portion $11a_3$ is greater than recording track width W1, that is, the width of the track portion $11a_1$.

Each of the branch portions $11a_{31}$, and $11a_{32}$ has an external edge located at an end of the width thereof. This external edge extends in the direction orthogonal to the air bearing surface 30. Each of the branch portions $11a_{31}$ and $11a_{32}$ has an internal edge located at the other end of the width thereof. When seen from the air bearing surface 30, this internal edge extends in the direction orthogonal to the air bearing surface 30, and at some midpoint starts to extend outward in the direction of width.

As shown in FIG. 7, the interface between the track portion $11a_1$ and the coupling portion $11a_2$ is located near the zero MR height position (the position of an end of the MR element 5 opposite to the air bearing surface 30). An end of the coupling portion $11a_2$ facing toward the air bearing surface 30 has the shape of a straight line parallel to the air bearing surface 30.

As shown in FIG. 7, the yoke portion layer 11c of the top pole layer 11 has a first portion $11c_1$, a second portion $11c_2$ and a third portion $11c_3$ in the order in which the closest to the air bearing surface 30 comes first. The first portion $11c_1$ has a constant width nearly equal to the entire width of the contact portion $11a_3$ of the pole portion layer 11a. The third portion $11c_3$ has a constant width greater than the width of the first portion $11c_1$. The width of the second portion $11c_2$ gradually decreases from the width of the third portion $11c_3$ to the width of the first portion $11c_1$ as the distance from the air bearing surface 30 decreases. The second portion $11c_2$ has edges located at ends of the width thereof wherein the width varies. It is preferred that each of these edges forms an angle of 30 to 60 degrees with respect to the direction orthogonal to the air bearing surface 30.

As shown in FIG. 7, the yoke portion layer 11c of the top pole layer 11 has an end face that faces toward the air bearing surface 30. This end face is located at a distance of only 0.5 to 2.0 μm, for example, from the air bearing surface 30. In this embodiment, in particular, the end face is located near zero throat height position THO or the zero MR height position.

As shown in FIG. 7, the first layer 13a and the second layer 13b of the thin-film coil 13 are coupled to each other through the coupling portions 13c in a zigzag manner. The thin-film coil 13 is thereby wound around the yoke portion layer 11c of the top pole layer 11 in a helical manner.

In this embodiment the bottom pole layer 8 made up of the first layer 8a, the second layer 8b and the third layer 8c corresponds to a first magnetic layer of the invention. The top pole layer 11 made up of the pole portion layer 11a, the magnetic layer 11b and the yoke portion layer 11c corresponds to a second magnetic layer of the invention.

As described so far, the thin-film magnetic head of the embodiment comprises: the medium facing surface (the air bearing surface 30) that faces toward a recording medium; the reproducing head; and the recording head (induction-type magnetic transducer). The reproducing head has: the MR element 5; and the bottom shield layer 3 and the top shield layer (the bottom pole layer 8) for shielding the MR element 5. Portions of the bottom shield layer 3 and the top shield layer located on a side of the air bearing surface 30 are opposed to each other, the MR element 5 being placed between the portions.

The recording head has the bottom pole layer 8 and the top pole layer 11 magnetically coupled to each other, each of which includes at least one layer. The bottom pole layer 8 and the top pole layer 11 include pole portions opposed to each other and placed in regions on a side of the air bearing surface 30. The recording head further has: the recording gap layer 10 placed between the pole portion of the bottom pole layer 8 and the pole portion of the top pole layer 11; and the thin-film coil 13 helically wound around the top pole layer 11 and insulated from the bottom pole layer 8 and the top pole layer 11, a part of the coil 13 passing between the bottom pole layer 8 and the top pole layer 11.

The top pole layer 11 has the pole portion layer 11a and the yoke portion layer 11c. The pole portion layer 11a has a surface adjacent to the recording gap layer 10 and includes the pole portion. The yoke portion layer 11c is connected to the other surface of the pole portion layer 11a and makes up the yoke portion. A part of the thin-film coil 13 is located on a side of the pole portion layer 11a. An end face of the yoke portion layer 11c facing toward the air bearing surface 30 is located at a distance from the air bearing surface 30.

The pole portion layer 11a has: the track portion $11a_1$ that defines the track width; the contact portion $11a_3$ that is in contact with the yoke portion layer 11c; and the coupling portion $11a_2$ that couples the track portion $11a_1$ to the contact portion $11a_3$. The contact portion $11a_3$ includes the two branch portions $11a_{31}$ and $11a_{32}$ that branch off from the coupling portion $11a_2$. The coupling portion $11a_2$ has the end $11a_4$ located between the branch portions $11a_{31}$ and $11a_{32}$ and located farther from the air bearing surface 30. The end $11a_4$ defines the throat height.

The insulating layer 9 is located between the first layer 8a of the bottom pole layer 8 and the contact portion $11a_3$ of the pole portion layer 11a of the top pole layer 11. Between the first layer 8a and the contact portion $11a_3$, the insulating layer 9 blocks the passage of a magnetic flux that does not pass through the magnetic layers 8 and 11. The insulating layer 9 corresponds to a flux blocking layer of the invention. The flux blocking layer may be a layer of nonmagnetic material in place of the insulating layer 9.

In this embodiment the thin-film coil 13 is helically wound around the top pole layer 11. As a result, the magetomotive force generated by the coil 13 is supplied to the top pole layer 11 with efficiency. It is therefore possible that the number of turns of the coil 13 is smaller than that of a head having a flat-whorl-shaped thin-film coil.

In the embodiment the first layer 13a of the thin-film coil 13 is placed on top of the flat insulating layer 12 and on a side of the pole portion layer 11a of the top pole layer 11, and the top surface of the insulating layer 14 that covers the first layer 13a is flattened. The yoke portion layer 11c of the top pole layer 11 is then formed on the insulating layer 14. Furthermore, the second layer 13b of the coil 13 is formed on the flat yoke portion layer 11c, the insulating film 17 being placed between the yoke portion layer 11c and the second layer 13b. As a result, both the first layer 13a and the second layer 13b of the coil 13 are formed on the flat surface. It is thereby possible to reduce the dimensions of the coil 13.

Furthermore, according to the embodiment, no rounded portion is formed near the outermost end of the insulating layer that insulates every neighboring turns of the thin-film coil 13. As a result, it is impossible that an increase in the yoke length is caused by such a rounded portion.

As thus described, according to the embodiment, the yoke length is reduced down to about 30 to 50 percent or less of that of a prior-art head, for example.

In the embodiment the pole portion layer 11a of the top pole layer 11 that defines the recording track width and the throat height is formed on the flat surface. It is thereby possible to form the pole portion layer 11a of small dimensions with accuracy. As a result, according to the embodiment, it is possible that the recording track width is reduced to the half-micron or quarter-micron order, and to define the recording track width and the throat height with accuracy even when the recording track width is thus reduced.

According to the embodiment, an end face of the yoke portion layer 11c of the top pole layer 11 facing toward the air bearing surface 30 is located at a distance from the air bearing surface 30. As a result, it is impossible that the yoke portion layer 11c is exposed from the air bearing surface 30. 'Side write' and 'side erase' are thereby prevented.

If a yoke portion layer is connected to a pole portion layer having a width equal to the recording track width and a length equal to the throat height, the cross-sectional area of the magnetic path abruptly decreases in the portion connecting the yoke portion layer to the pole portion layer. A magnetic flux is thereby saturated in this portion. In this case, if an end face of the yoke portion layer facing toward the air bearing surface is located at a distance from the air bearing surface, the area of the portions of the pole portion layer and the yoke portion layer touching each other decreases. Consequently, saturation of the magnetic flux more frequently results in the portion connecting the pole portion layer to the yoke portion layer. If the pole portion layer is increased in length in order to prevent such saturation of the flux, the throat height is increased.

According to the embodiment, in contrast, the pole portion layer 11a has: the track portion $11a_1$ that defines the track width; the contact portion $11a_3$ that is in contact with the yoke portion layer 11c; and the coupling portion $11a_2$ that couples the track portion $11a_1$ to the contact portion $11a_3$. The contact portion $11a_3$ includes the two branch portions $11a_{31}$ and $11a_{32}$ that branch off from the coupling portion $11a_2$. The coupling portion $11a_2$ has the end $11a_4$ located between the branch portions $11a_{31}$ and $11a_{32}$ and located farther from the air bearing surface 30. The end $11a_4$ defines the throat height.

As a result, according to the embodiment, the contact portion $11a_3$ allows the pole portion layer 11a and the yoke portion layer 11c to be in contact with each other, while maintaining a sufficient contact area, even in the position farther from the air bearing surface 30 than the zero throat height position. Therefore, it is possible to prevent side write and side erase by locating an end face of the yoke portion layer 11c facing toward the air bearing surface 30 at a distance from the air bearing surface 30, and to prevent an abrupt reduction in the cross-sectional area of the magnetic path in the top pole layer 11 so as to prevent saturation in the magnetic flux halfway through the magnetic path. Furthermore, according to the embodiment, the throat height is defined by the end $11a_4$, that is, an end of the coupling portion $11a_2$ located between the branch portions $11a_{31}$ and $11a_{32}$ and located farther from the air bearing surface 30. It is therefore impossible that the existence of the contact portion $11a_3$ causes an increase in the throat height.

According to the embodiment, the geometry and dimensions of the contact portion $11a_3$ of the pole portion layer 11a may be controlled so as to control the flow of the magnetic flux passing through the top pole layer 11.

As thus described, according to the embodiment, it is possible that the magnetomotive force generated by the coil 13 is utilized for writing with efficiency. It is therefore possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data.

According to the embodiment, the insulating layer 9 is provided between the first layer 8a of the bottom pole layer 8 and the contact portion $11a_3$ of the pole portion layer 11a of the top pole layer 11. The insulating layer 9 functions as the flux blocking layer that blocks the passage of a magnetic flux. As a result, between the first layer 8a and the contact portion $11a_3$, the passage of the magnetic flux that does not pass through the magnetic layers 8 and 11 is prevented.

According to the embodiment, the first layer 13a of the thin-film coil 13 is placed on a side of the pole portion layer 11a of the top pole layer 11, and the top surface of the insulating layer 14 that covers the first layer 13a is flattened. The yoke portion layer 11c of the top pole layer 11 is then formed on the insulating layer 14. As a result, the yoke portion layer 11c is formed as a flat layer on the flat surface. According to the embodiment, it is thereby possible to precisely control the composition of the yoke portion layer 11c and to maintain the characteristics of the recording head with stability when the thin-film magnetic heads are mass-produced.

According to the embodiment, in addition to the recording gap layer 10, the insulating layer 9 and the insulating film 12 are provided between the bottom pole layer 8 and the first layer 13a of the coil 13. The insulating layer 9 and the insulating film 12 are made of an inorganic material and thicker than the recording gap layer 10, and achieve sufficient insulation strength. High insulation strength is thereby obtained between the bottom pole layer 8 and the first layer 13a.

[Second Embodiment]

Figure 10:
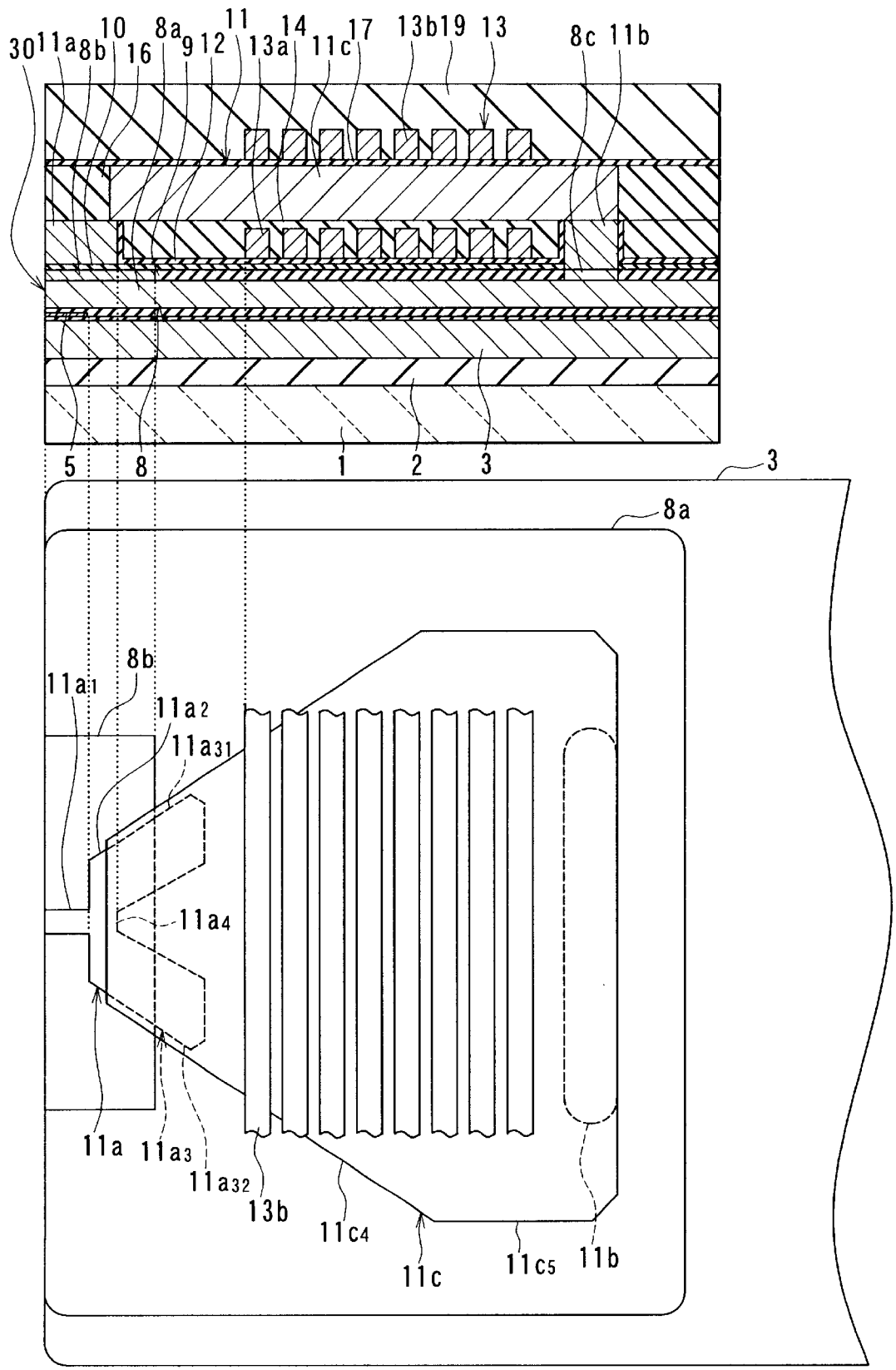
FIG. 10 is an explanatory view for illustrating the relationship between a cross-sectional view of a thin-film magnetic head of a second embodiment of the invention and a top view of the main part of the head.

Reference is now made to FIG. 10 to describe a thin-film magnetic head and a method of manufacturing the same of a second embodiment of the invention. FIG. 10 is an explanatory view for illustrating the relationship between a cross-sectional view (an upper view of FIG. 10) of the thin-film magnetic head of the embodiment and a top view (a lower view of FIG. 10) of the main part of the head.

In this embodiment the two branch portions $11a_{31}$ and $11a_{32}$ of the pole portion layer 11a of the top pole layer 11 have a shape in which the space between the portions $11a_{31}$ and $11a_{32}$ increases as the distance from the air bearing surface 30 increases. The combination of the coupling portion $11a_2$ and the portions $11a_{31}$ and $11a_{32}$ is V-shaped.

The yoke portion layer 11c of the top pole layer 11 has a first portion $11c_4$ and a second portion $11c_5$ in the order in which the closest to the air bearing surface 30 comes first. The second portion $11c_5$ has a constant width nearly equal to the width of the third portion $11c_3$ of the yoke portion layer 11c of the first embodiment. The width of the first portion $11c_4$ gradually decreases from the width of the second portion $11c_5$ as the distance from the air bearing surface 30 decreases. The first portion $11c_4$ has edges located at ends of the width thereof wherein the width varies. It is preferred that each of these edges forms an angle of 30 to 60 degrees with respect to the direction orthogonal to the air bearing surface 30.

A part of the first portion $11c_4$ of the yoke portion layer 11c is laid over a part of the contact portion $11a_3$ of the pole portion layer 11a. These parts are nearly equal in width. An end face of the yoke portion layer 11c facing toward the air bearing surface 30 is located near the zero throat height position or the zero MR height position.

In this embodiment the width of the first portion $11c_4$ of the yoke portion layer 11c gradually decreases as the distance from the air bearing surface 30 decreases. In addition, the contact portion $11a_3$ of the pole portion layer 11a has the shape in which the space between the branch portions $11a_{31}$ and $11a_{32}$ gradually decreases as the distance from the air bearing surface 30 decreases. As a result, it is impossible that the cross-sectional area of the magnetic path abruptly decreases in the top pole layer 11, and it is possible to prevent a magnetic flux from saturating halfway through the magnetic path.

The remainder of the configuration, functions and effects of the second embodiment are similar to those of the first embodiment.

[Third Embodiment]

Figure 11:
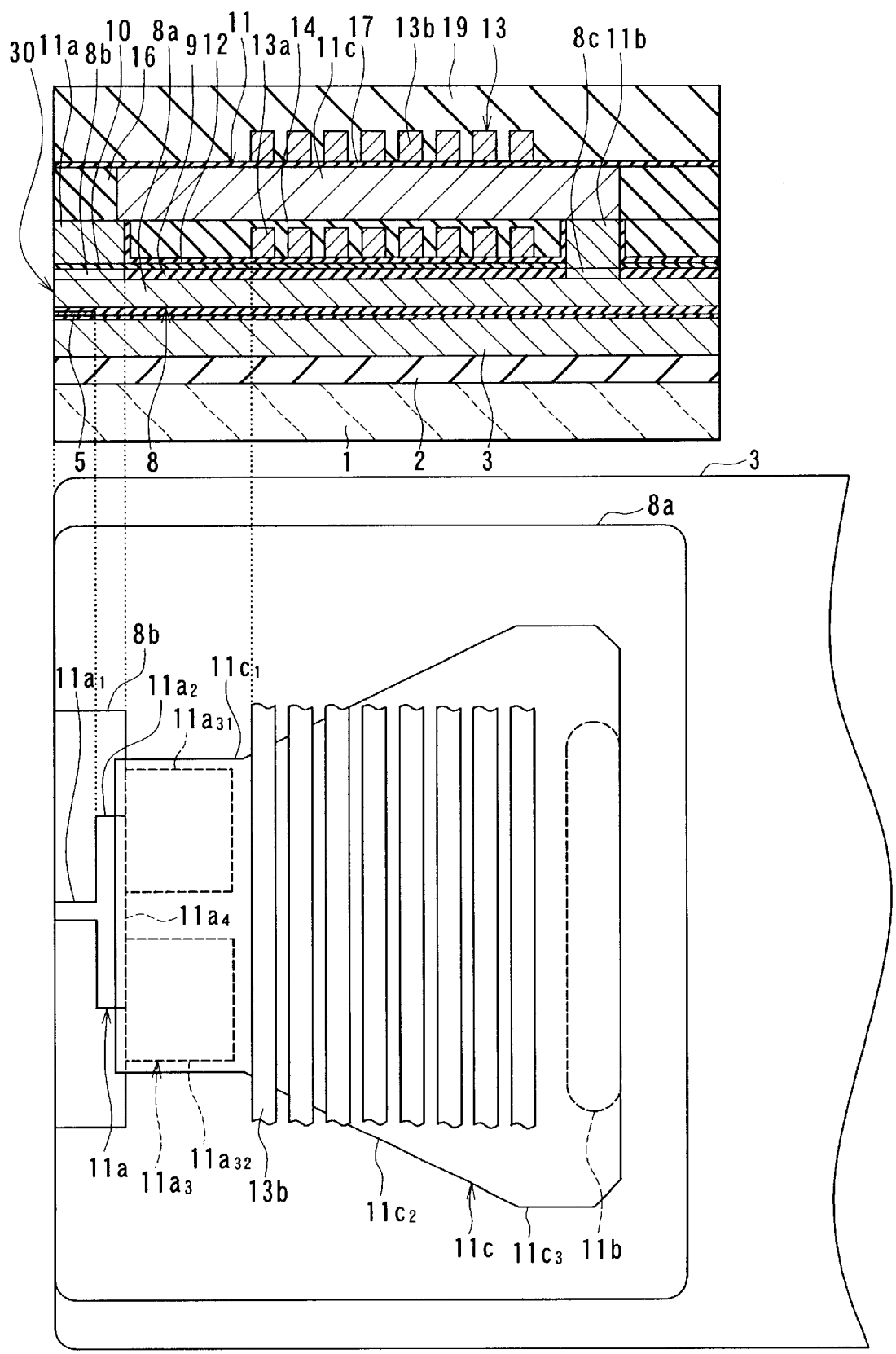
FIG. 11 is an explanatory view for illustrating the relationship between a cross-sectional view of a thin-film magnetic head of a third embodiment of the invention and a top view of the main part of the head.

Reference is now made to FIG. 11 to describe a thin-film magnetic head and a method of manufacturing the same of a third embodiment of the invention. FIG. 11 is an explanatory view for illustrating the relationship between a cross-sectional view (an upper view of FIG. 11) of the thin-film magnetic head of the embodiment and a top view (a lower view of FIG. 11) of the main part of the head.

In this embodiment each of the two branch portions $11a_{31}$ and $11a_{32}$ of the pole portion layer 11a of the top pole layer 11 has a plane geometry of a quadrangle. The coupling portion $11a_2$ has a plane geometry of a rectangle that is long in the direction of width.

The yoke portion layer 11c of the top pole layer 11 has the first portion $11c_1$, the second portion $11c_2$ and the third portion $11c_3$ that are similar to those of the first embodiment.

A part of the first portion $11c_1$ of the yoke portion layer 11c is laid over a part of the contact portion $11a_3$ of the pole portion layer 11a. These parts are nearly equal in width. An end face of the yoke portion layer 11c facing toward the air bearing surface 30 is located near the zero throat height position or the zero MR height position.

In this embodiment each of the branch portions $11a_{31}$ and $11a_{32}$ of the pole portion layer 11a has a plane geometry of a quadrangle. As a result, the area in which the contact portion $11a_3$ of the pole portion layer 11a touches the first portion $11c_1$ of the yoke portion layer 11c is greater, compared to the first or second embodiment. It is thereby possible to more effectively prevent a magnetic flux from saturating in the portion in which the contact portion $11a_3$ is in contact with the first portion $11c_1$.

The remainder of the configuration, functions and effects of the third embodiment are similar to those of the first embodiment.

[Fourth Embodiment]

Figure 12A:
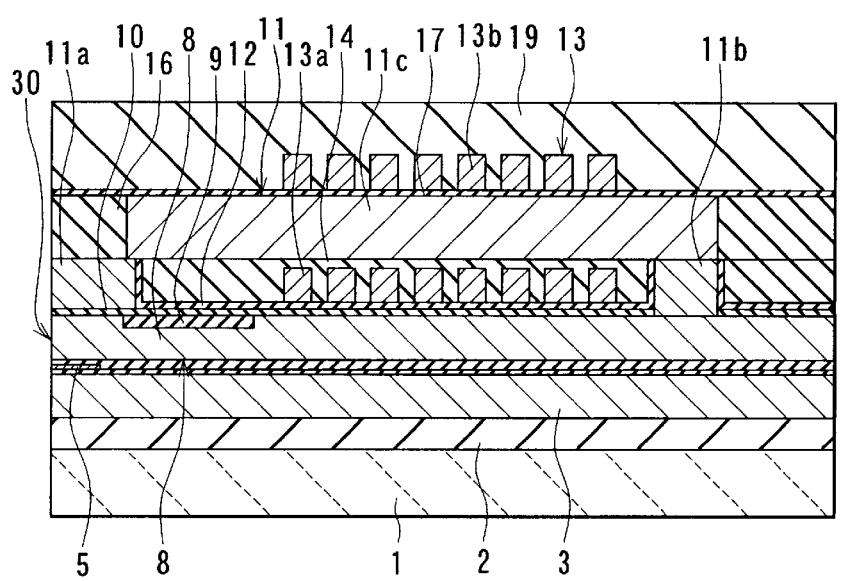
FIG. 12A and FIG. 12B are cross sections of a thin-film magnetic head of a fourth embodiment of the invention.
Figure 12B:
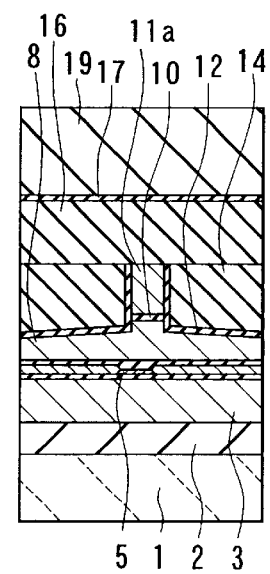
Figure 13:
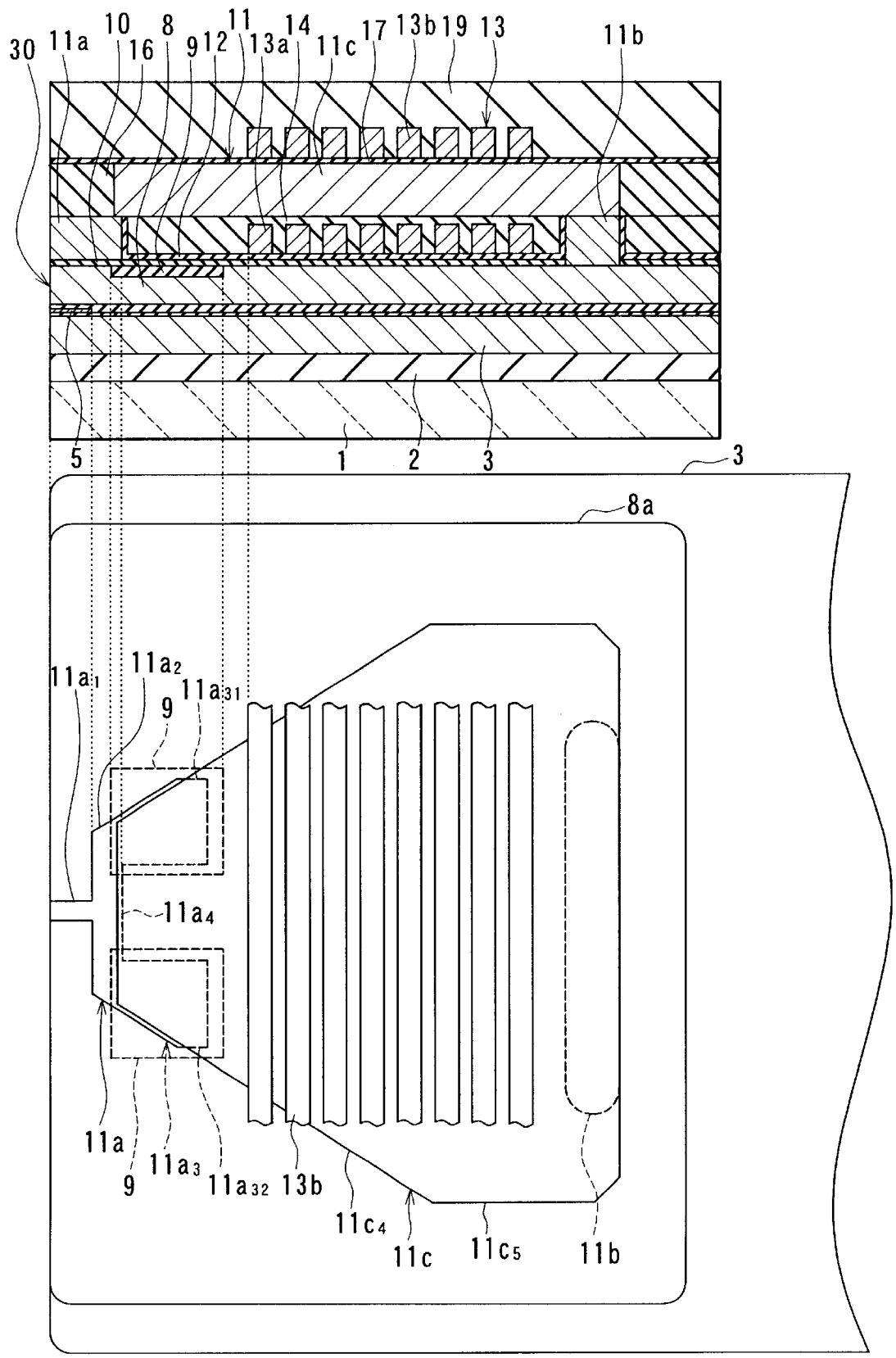
FIG. 13 is an explanatory view for illustrating the relationship between a cross-sectional view of a thin-film magnetic head of the fourth embodiment and a top view of the main part of the head.

Reference is now made to FIG. 12A, FIG. 12B and FIG. 13 to describe a thin-film magnetic head and a method of manufacturing the same of a fourth embodiment of the invention. FIG. 12A is a cross section orthogonal to an air bearing surface. FIG. 12B is a cross section of a pole portion of the head parallel to the air bearing surface. FIG. 13 is an explanatory view for illustrating the relationship between a cross-sectional view (an upper view of FIG. 13) of the thin-film magnetic head of the embodiment and a top view (a lower view of FIG. 13) of the main part of the head.

In this embodiment the yoke portion layer 11c of the top pole layer 11 has the first portion $11c_4$ and the second portion $11c_5$ that are similar to those of the second embodiment.

The two branch portions $11a_{31}$ and $11a_{32}$ of the pole portion layer 11a of the top pole layer 11 have external edges located at ends of the width thereof. When seen from the air bearing surface 30, these external edges extend outward in the direction of width. The branch portions $11a_{31}$ and $11a_{32}$ have internal edges located at the other ends of the width thereof. These internal edges extend in the direction orthogonal to the air bearing surface 30.

A part of the first portion $11c_4$ of the yoke portion layer 11c is laid over a part of the contact portion $11a_3$ of the pole portion layer 11a. These parts are nearly equal in width. An end face of the yoke portion layer 11c facing toward the air bearing surface 30 is located near the zero throat height position or the zero MR height position.

In this embodiment, as shown in FIG. 13, the insulating layer 9 is divided into two and located in two regions where the first portion $11c_4$ of the yoke portion layer $11c$ and the branch portions $11a_{31}$ and $11a_{32}$ of the pole portion layer $11a$ overlap each other. In the embodiment the bottom pole layer 8 is made up of one layer. Concavities are formed in specific regions in the top surface of the bottom pole layer 8. The divided portions of the insulating layer 9 are embedded in these concavities. The cross-sectional views of FIG. 12A and FIG. 13 are taken along a line passing through the insulating layer 9.

Alternatively, instead of forming the insulating layer 9 as described above, an insulating layer of organic insulating material such as photoresist may be formed on the recording gap layer 10 in the two regions where the first portion $11c_4$ of the yoke portion layer $11c$ and the branch portions $11a_{31}$ and $11a_{32}$ of the pole portion layer $11a$ are to overlap each other. The pole portion layer $11a$ may be then formed on this insulating layer.

In this embodiment the throat height defining end $11a_4$ of the pole portion layer $11a$ is greater in length than that of any of the first to third embodiments. It is thereby possible through photolithography to form the end $11a_4$ with accuracy and to control the geometry of the coupling portion $11a_2$ with accuracy. Therefore, according to the embodiment, it is possible to define the throat height with more accuracy. Furthermore, according to the embodiment, the design of length and width of the coupling portion $11a_2$ allows control of the flow of the magnetic flux in the coupling portion $11a_2$. Through such control of the flow of the flux, it is possible to prevent side write, side erase, and so-called 'write blurring' (an enlargement of a data recording region on a recording medium) that results from generation of an excess magnetic flux on the air bearing surface 30. In addition, it is possible to prevent write blurring in the high frequency band.

The remainder of the configuration, functions and effects of the fourth embodiment are similar to those of the first embodiment.

[Fifth Embodiment]

Figure 14A:
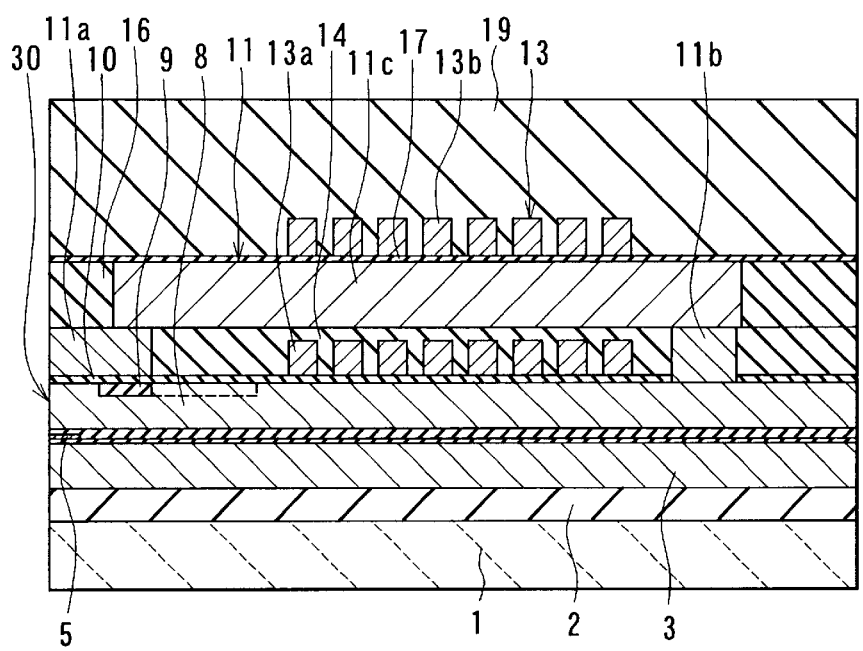
FIG. 14A and FIG. 14B are cross sections of a thin-film magnetic head of a fifth embodiment of the invention.
Figure 14B:
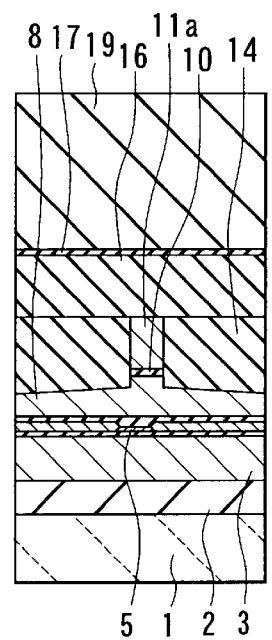
Figure 15:
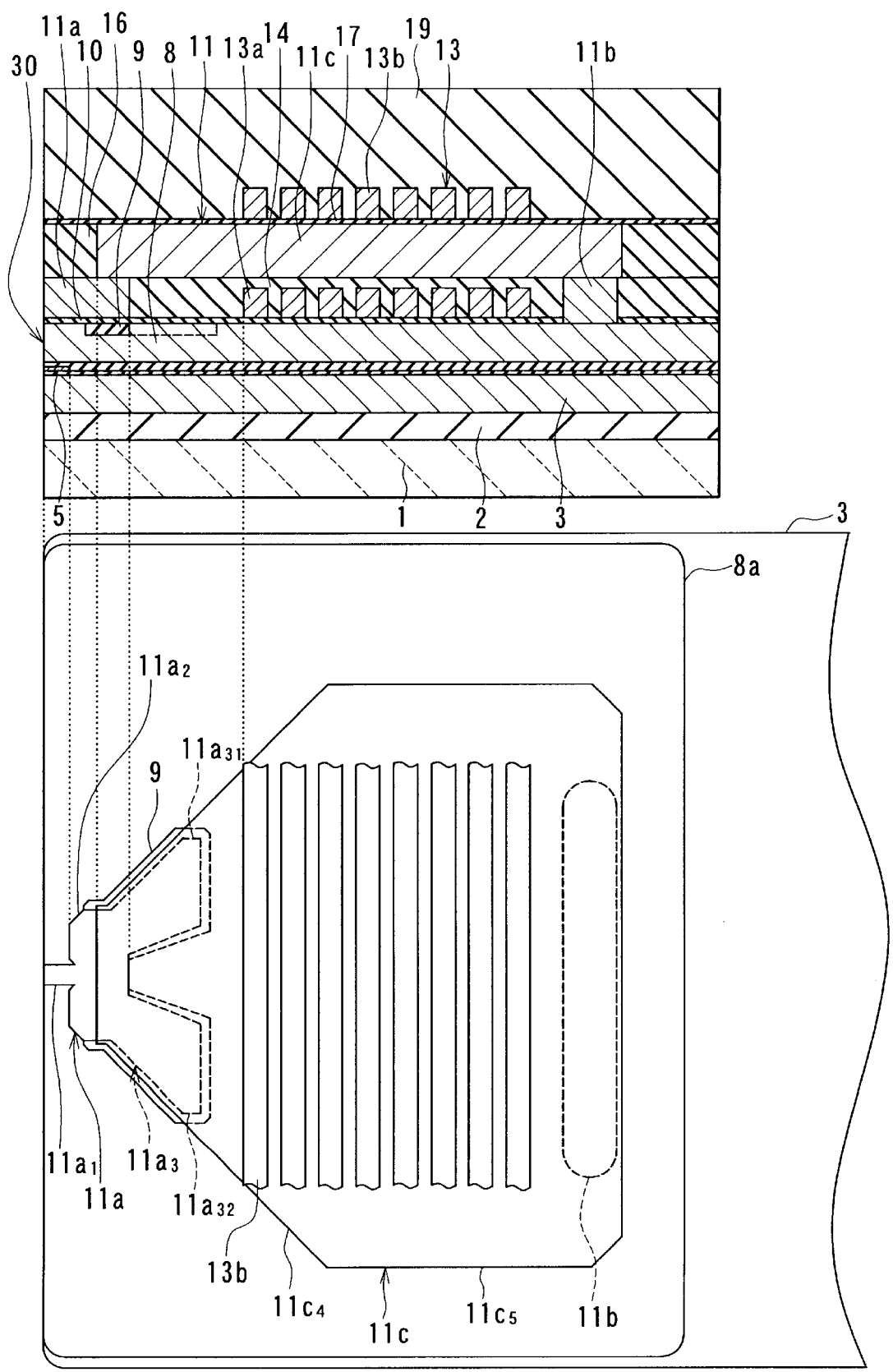
FIG. 15 is an explanatory view for illustrating the relationship between a cross-sectional view of a thin-film magnetic head of the fifth embodiment and a top view of the main part of the head.

Reference is now made to FIG. 14A, FIG. 14B and FIG. 15 to describe a thin-film magnetic head and a method of manufacturing the same of a fifth embodiment of the invention. FIG. 14A is a cross section orthogonal to an air bearing surface. FIG. 14B is a cross section of a pole portion of the head parallel to the air bearing surface. FIG. 15 is an explanatory view for illustrating the relationship between a cross-sectional view (an upper view of FIG. 15) of the thin-film magnetic head of the embodiment and a top view (a lower view of FIG. 15) of the main part of the head.

In this embodiment the yoke portion layer $11c$ of the top pole layer 11 has the first portion $11c_4$ and the second portion $11c_5$ that are similar to those of the second embodiment.

The two branch portions $11a_{31}$ and $11a_{32}$ of the pole portion layer $11a$ of the top pole layer 11 have a shape in which the space between the portions $11a_{31}$ and $11a_{32}$ increases as the distance from the air bearing surface 30 increases. The combination of the coupling portion $11a_2$ and the portions $11a_{31}$ and $11a_{32}$ is V-shaped. In this embodiment the width of each of the branch portions $11a_{31}$ and $11a_{32}$ gradually decreases as the distance from the air bearing surface 30 decreases.

A part of the first portion $11c_4$ of the yoke portion layer $11c$ is laid over a part of the contact portion $11a_3$ of the pole portion layer $11a$. These parts are nearly equal in width. An end face of the yoke portion layer $11c$ facing toward the air bearing surface 30 is located near the zero throat height position or the zero MR height position.

In this embodiment, as shown in FIG. 15, the insulating layer 9 is located in a region corresponding to the coupling portion $11a_2$ and the contact portion $11a_3$ of the pole portion layer $11a$. In the embodiment a concavity is formed in a specific region in the top surface of the bottom pole layer 8, and the insulating layer 9 is embedded in this concavity as in the fourth embodiment.

In the fifth embodiment the insulating film 12 is not provided while the first layer $13a$ of the thin-film coil 13 is formed on the recording gap layer 10.

The remainder of the configuration, functions and effects of the fifth embodiment are similar to those of the first embodiment.

[Sixth Embodiment]

Figure 16:
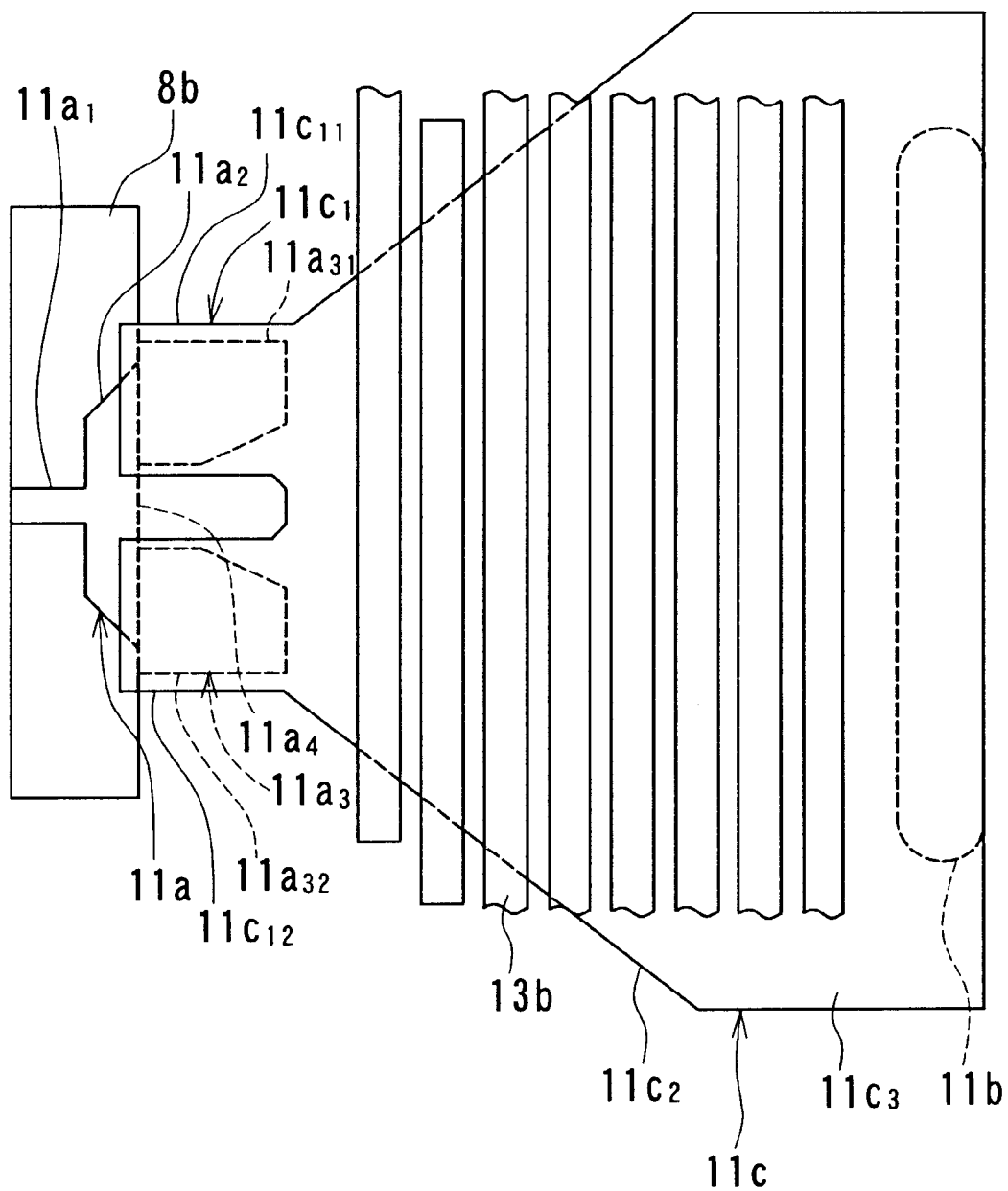
FIG. 16 is a top view of the main part of a thin-film magnetic head of a sixth embodiment of the invention.

Reference is now made to FIG. 16 to describe a thin-film magnetic head and a method of manufacturing the same of a sixth embodiment of the invention. FIG. 16 is a top view of the main part of the thin-film magnetic head of the embodiment.

In this embodiment the yoke portion layer $11c$ of the top pole layer 11 has the first portion $11c_1$, the second portion $11c_2$ and the third portion $11c_3$ in the order in which the closest to the air bearing surface 30 comes first, as in the first embodiment. In the sixth embodiment the first portion $11c_1$ is divided into the branch portions $11c_{11}$ and $11c_{12}$. The branch portion $11c_{11}$ is located in a region corresponding to the branch portion $11a_{31}$ of the pole portion layer $11a$. The branch portion $11c_{12}$ is located in a region corresponding to the branch portion $11a_{32}$ of the pole portion layer $11a$.

According to this embodiment, the first portion $11c_1$ (the branch portions $11c_{11}$ and $11c_{12}$) of the yoke portion layer $11c$ has the shape that corresponds to the contact portion $11a_3$ (the branch portions $11a_{31}$ and $11a_{32}$) of the pole portion layer $11a$. As a result, it is possible to more effectively prevent a magnetic flux from saturating in the portion where the first portion $11c_1$ and the contact portion $11a_3$ are in contact with each other.

The remainder of the configuration, functions and effects of the sixth embodiment are similar to those of the first embodiment.

[Seventh Embodiment]

Figure 17:
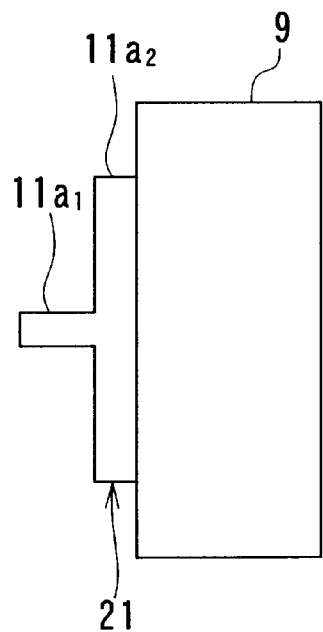
FIG. 17 is a top view for illustrating a step of forming a pole portion layer of a seventh embodiment of the invention.
Figure 18:
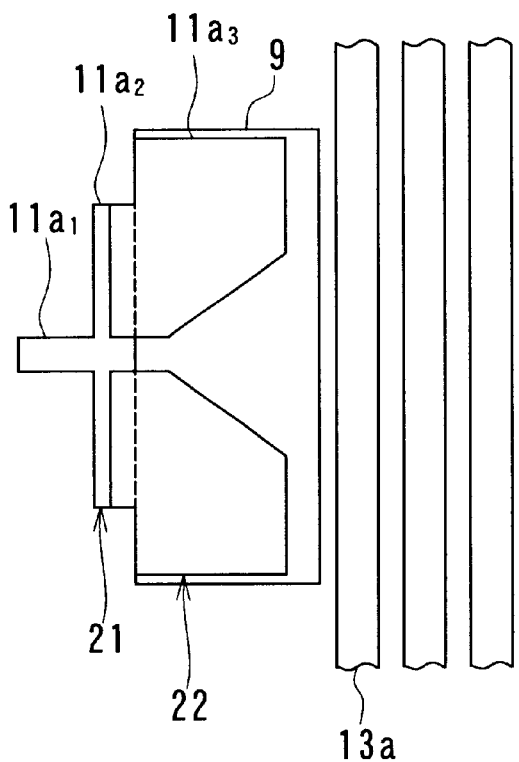
FIG. 18 is a top view for illustrating a step of forming the pole portion layer of the seventh embodiment.
Figure 19:
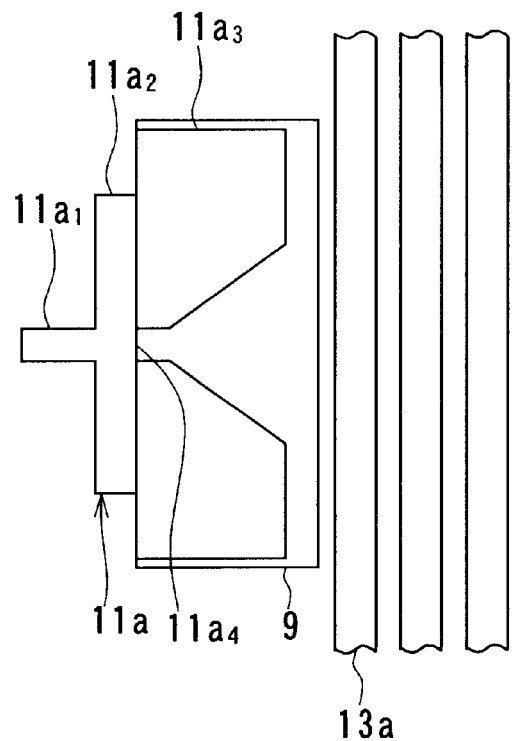
FIG. 19 is a top view for illustrating a step of forming the pole portion layer of the seventh embodiment.

Reference is now made to FIG. 17 to FIG. 19 to describe a thin-film magnetic head and a method of manufacturing the same of a seventh embodiment of the invention. This embodiment is an example in which some improvements are made in the method of forming the pole portion layer $11a$ of the top pole layer 11. FIG. 17 to FIG. 19 are top views for illustrating the steps of forming the pole portion layer of the embodiment.

In the method of forming the pole portion layer $11a$ of this embodiment, as shown in FIG. 17, a magnetic layer 21 to be the track portion $11a_1$ and the coupling portion $11a_2$ of the pole portion layer $11a$ is formed on a recording gap layer not shown. The magnetic layer 21 is T-shaped. In the region where the contact portion $11a_3$ of the pole portion layer $11a$ is to be formed, the insulating layer 9 is formed on or below the recording gap layer.

Next, as shown in FIG. 18, in the region where the contact portion $11a_3$ is to be formed, a magnetic layer 22 to be the contact portion $11a_3$ is formed. The magnetic layer 22 is formed to touch or overlap the magnetic layer 21. Next, the recording gap layer and the bottom pole layer are etched with the track portion $11a_1$ as a mask to form a trim structure. Next, an insulating film is formed in a region where the first layer $13a$ of the thin-film coil 13 is to be formed. The first layer $13a$ is then formed on this insulating film.

Next, as shown in FIG. 19, an insulating layer of alumina, for example, is formed over the entire surface. This insulating layer is polished through CMP, for example, so that the track portion $11a_1$ and the coupling portion $11a_2$ are exposed, and the surface is flattened. The pole portion layer $11a$ is thus completed.

Through the method of forming the pole portion layer $11a$ thus described, it is possible to form the magnetic layer 21 to be the track portion $11a_1$ and the coupling portion $11a_2$ with accuracy. As a result, it is possible to form the throat height defining end $11a_4$ with accuracy and to precisely define the throat height.

The remainder of the configuration, functions and effects of the seventh embodiment are similar to those of the first embodiment.

[Eighth Embodiment]

Figure 20:
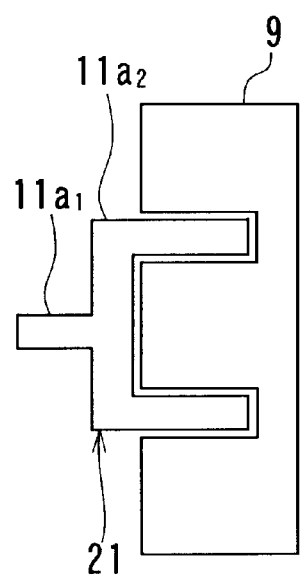
FIG. 20 is a top view for illustrating a step of forming a pole portion layer of an eighth embodiment of the invention.
Figure 21:
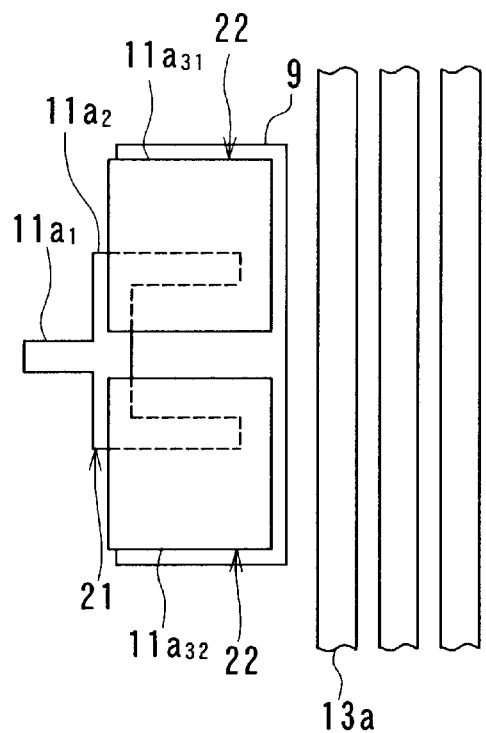
FIG. 21 is a top view for illustrating a step of forming the pole portion layer of the eighth embodiment.
Figure 22:
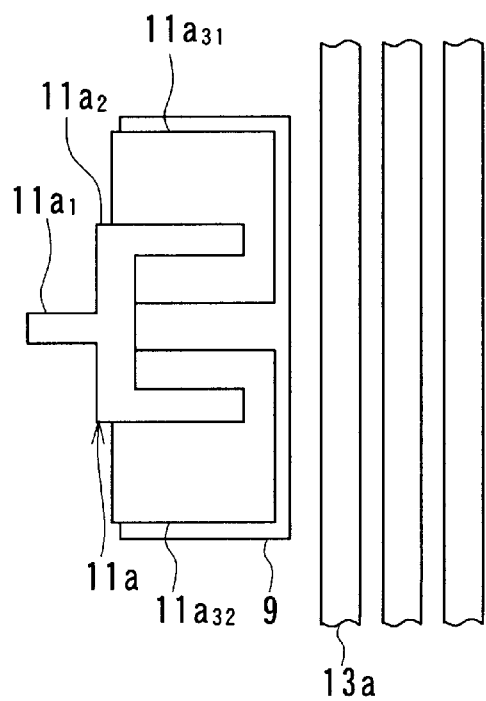
FIG. 22 is a top view for illustrating a step of forming the pole portion layer of the eighth embodiment.

Reference is now made to FIG. 20 to FIG. 22 to describe a thin-film magnetic head and a method of manufacturing the same of an eighth embodiment of the invention. This embodiment is an example in which some improvements are made in the method of forming the pole portion layer $11a$ of the top pole layer 11, as the seventh embodiment. FIG. 20 to FIG. 22 are top views for illustrating the steps of forming the pole portion layer of the embodiment.

In the method of forming the pole portion layer $11a$ of this embodiment, as shown in FIG. 20, the magnetic layer 21 to be the track portion $11a_1$ and the coupling portion $11a_2$ of the pole portion layer $11a$ is formed on a recording gap layer not shown. In this embodiment the magnetic layer 21 includes portions to be parts of the branch portions $11a_{31}$ and $11a_{32}$, too. The entire magnetic layer 21 is nearly Y-shaped. In the region where the contact portion $11a_3$ of the pole portion layer $11a$ is to be formed, the insulating layer 9 is formed on or below the recording gap layer.

Next, as shown in FIG. 21, in regions where the branch portions $11a_{31}$ and $11a_{32}$ of the contact portion $11a_3$ are to be formed, magnetic layers 22 to be the branch portions $11a_{31}$ and $11a_{32}$ are formed. The magnetic layers 22 are formed to overlap the magnetic layer 21. Next, the recording gap layer and the bottom pole layer are etched with the track portion $11a_1$ as a mask to form a trim structure. Next, an insulating film is formed in a region where the first layer $13a$ of the thin-film coil 13 is to be formed. The first layer $13a$ is then formed on this insulating film.

Next, as shown in FIG. 22, an insulating layer of alumina, for example, is formed over the entire surface. This insulating layer is polished through CMP, for example, so that the track portion $11a_1$ and the coupling portion $11a_2$ are exposed, and the surface is flattened. The pole portion layer $11a$ is thus completed.

The remainder of the configuration, functions and effects of the eighth embodiment are similar to those of the seventh embodiment.

[Ninth Embodiment]

Reference is now made to FIG. 23A to FIG. 28A, FIG. 23B to FIG. 28B, and FIG. 29 to describe a thin-film magnetic head and a method of manufacturing the same of a ninth embodiment of the invention. FIG. 23A to FIG. 28A are cross sections each orthogonal to an air bearing surface. FIG. 23B to FIG. 28B are cross sections of the pole portion each parallel to the air bearing surface.

The thin-film magnetic head of the ninth embodiment comprises a thin-film coil wound doubly around the top pole layer in a helical manner. In this embodiment an outer portion of the coil is called a first portion and an inner portion is called a second portion. Each of the first and second portions of the coil may be made of copper, for example.

The steps of the method of manufacturing the thin-film magnetic head of the ninth embodiment that are taken until the top shield gap film 7 is formed are similar to those of the first embodiment.

Next, as shown in FIG. 23A and FIG. 23B, the bottom pole layer 8 having a thickness of about 3 μm is selectively formed on the top shield gap film 7.

The bottom pole layer 8 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering, and then selectively etched through ion milling, for example, and formed into the specific shapes. Alternatively, a material such as CoFe or a Co-base amorphous material as a high saturation flux density material may be used.

Next, although not shown, an insulating layer of alumina, for example, having a thickness of 4 to 5 μm, for example, is formed over the entire surface. This insulating layer is polished through CMP, for example, so that the bottom pole layer 8 is exposed and the surface is flattened.

Next, as shown in FIG. 24A and FIG. 24B, the recording gap layer 10 made of an insulating material whose thickness is 0.15 to 0.3 μm, for example, is formed on the bottom pole layer 8. Next, a portion of the recording gap layer 10 is etched to form a contact hole for making the magnetic path.

Next, on the recording gap layer 10, a pole portion layer $31a$ including a pole portion of a top pole layer 31 is formed. The pole portion layer $31a$ has a thickness of 2 to 4 μm, for example. At the same time, a magnetic layer having a thickness of 2 to 4 μm is fabricated in the above-mentioned contact hole. The top pole layer 31 of this embodiment is made up of an intermediate layer $31c$, a magnetic layer $31d$ and a yoke portion layer $31e$ described later, in addition to the pole portion layer $31a$ and the magnetic layer $31b$. The magnetic layers $31b$ and $31d$ are provided for connecting the yoke portion layer $31e$ to the bottom pole layer 8.

Next, as shown in FIG. 25A and FIG. 25B, the recording gap layer 10 is selectively etched through dry etching, using the pole portion layer $31a$ of the top pole layer 31 as a mask. Next, the bottom pole layer 8 is selectively etched by a depth of only 0.2 to 0.5 μm, for example, through argon ion milling, for example. A trim structure as shown in FIG. 25B is thus formed.

Next, an insulating film 32 of alumina, for example, is formed over the entire surface. The thickness of the insulating film 32 is about 0.3 to 0.6 μm.

Next, on a portion of the insulating film 32 between the pole portion layer $31a$ and the magnetic layer $31b$, a first layer $41a$ of the first portion of the thin-film coil is formed by frame plating. For example, the thickness of the first layer $41a$ is 1 to 2 μm. The first portion of the thin-film coil 13 is made up of the first layer $41a$, and a second layer $41b$ described later and a coupling portion not shown. The first layer $41a$ is located on a side of the pole portion layer $31a$ of the top pole layer 31 (that is, on the right side of FIG. 25A). The first layer $41a$ is made up of a plurality of square-prism-shaped portions extending in the direction intersecting the drawing sheet of FIG. 25A.

Next, as shown in FIG. 26A and FIG. 26B, an insulating layer 33 of alumina, for example, having a thickness of about 3 to 4 μm is formed over the entire surface. The insulating layer 33 is then polished through CMP, for example, until the pole portion layer $31a$ and the magnetic layer $31b$ of the top pole layer 31 are exposed, and the surface is flattened. Although the first layer $41a$ of the first portion of the coil is not exposed in FIG. 26A, the first layer $41a$ may be exposed.

Next, as shown in FIG. 27A and FIG. 27B, the intermediate layer 31c of the top pole layer 31 having a thickness of 3 to 4 μm, for example, is formed in a region extending from the top of the pole portion layer 31a of the top pole layer 31 to the insulating layer 33. At the same time, a magnetic layer 31d having a thickness of 3 to 4 μm is formed on the magnetic layer 31b. An end face of the intermediate layer 31c facing toward the air bearing surface 30 is located at a distance from the air bearing surface 30 (that is, on the right side of FIG. 27A).

The pole portion layer 31a, the magnetic layer 31b, the intermediate layer 31c and the magnetic layer 31d of the top pole layer 31 may be made of NiFe (80 weight % Ni and 20 weight % Fe), or NiFe (45 weight % Ni and 55 weight % Fe) as a high saturation flux density material through plating, or may be made of a material such as FeN or FeZrN as a high saturation flux density material through sputtering. Alternatively, a material such as CoFe or a Co-base amorphous material as a high saturation flux density material may be used.

Next, an insulating film 34 of alumina, for example, is formed over the entire surface. The thickness of the insulating film 34 is about 0.3 to 0.6 μm.

Next, on a portion of the insulating film 34 between the intermediate layer 31c and the magnetic layer 31d, a first layer 42a of the second portion of the thin-film coil is formed by frame plating. For example, the thickness of the first layer 42a is 1 to 2 μm. The second portion of the thin-film coil is made up of the first layer 42a, a second layer 42b described later and a coupling portion not shown. The first layer 42a is located on a side of the intermediate layer 31c of the top pole layer 31 (that is, on the right side of FIG. 27A). The first layer 42a is made up of a plurality of square-prism-shaped portions extending in the direction intersecting the drawing sheet of FIG. 27A.

Next, as shown in FIG. 28A and FIG. 28B, an insulating layer 35 of alumina, for example, having a thickness of about 3 to 4 μm is formed over the entire surface. The insulating layer 35 is then polished through CMP, for example, until the intermediate layer 31c and the magnetic layer 31d of the top pole layer 31 are exposed, and the surface is flattened.

Next, a yoke portion layer 31e having a thickness of 3 to 4 μm, for example, is formed on the intermediate layer 31c and the magnetic layer 31d of the top pole layer 31 flattened and the insulating layer 35. The yoke portion layer 31e forms a yoke portion of the top pole layer 31. The yoke portion layer 31e is in contact and magnetically coupled to the bottom pole layer 8 through the magnetic layers 31d and 31b. The yoke portion layer 31e may be made of NiFe (80 weight % Ni and 20 weight % Fe), or NiFe (45 weight % Ni and 55 weight % Fe) as a high saturation flux density material and formed through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 31e may be made of a number of layers of inorganic insulating films and magnetic layers of Permalloy, for example.

An end face of the yoke portion layer 31e facing toward the air bearing surface 30 is located at a distance from the air bearing surface 30 (that is, on the right side of FIG. 28A).

Next, an insulating layer 36 of alumina, for example, having a thickness of about 3 to 4 μm is formed over the entire surface. The insulating layer 36 is then polished through CMP, for example, so that the yoke portion layer 31e of the top pole layer 31 is exposed, and the surface is flattened. Next, an insulating film 37 of alumina, for example, having a thickness of about 0.3 to 0.5 μm is formed over the entire surface.

Next, although not shown, contact holes are formed through RIE or ion milling, for example, in portions on top of both ends of each of the square-prism-shaped portions of the first layer 42a of the second portion of the coil. Those contact holes penetrate the insulating film 37 and the insulating layer 35, and reach the first layer 42a.

Next, a second layer 42b of the second portion of the thin-film coil is formed by frame plating on a portion of the insulating film 37 located on top of the yoke portion layer 31e of the top pole layer 31. For example, the thickness of the second layer 42b is 1 to 2 μm. The second layer 42b is made up of a plurality of square-prism-shaped portions extending in the direction orthogonal to the drawing sheet of FIG. 28A. Both ends of each of the square-prism-shaped portions of the second layer 42b are connected to both ends of each of the square-prism-shaped portions of the first layer 42a through coupling portions made of the above-described contact holes filled with the material of the thin-film coil.

Next, an insulating layer 38 of alumina, for example, having a thickness of about 3 to 4 μm is formed over the entire surface. The surface of the insulating layer 38 is then flattened.

Next, although not shown, contact holes are formed through RIE or ion milling, for example, in portions on top of both ends of each of the square-prism-shaped portions of the first layer 41a of the first portion of the coil. Those contact holes penetrate the insulating layer 38, the insulating film 37 and the insulating layer 33, and reach the first layer 41a.

Next, a second layer 41b of the first portion of the thin-film coil is formed by frame plating on the insulating film 38. For example, the thickness of the second layer 41b is 1 to 2 μm. The second layer 41b is made up of a plurality of square-prism-shaped portions extending in the direction orthogonal to the drawing sheet of FIG. 28A. Both ends of each of the square-prism-shaped portions of the second layer 41b are connected to both ends of each of the square-prism-shaped portions of the first layer 41a through coupling portions made of the above-described contact holes filled with the material of the thin-film coil.

Next, an overcoat layer 39 of alumina, for example, having a thickness of 20 to 40 μm, for example, is formed over the entire surface. The surface of the overcoat layer 39 is then flattened and pads (not shown) for electrodes are formed on the overcoat layer 39. Finally, lapping of the slider is performed to form the air bearing surface 30 of the thin-film magnetic head including the recording head and the reproducing head. The thin-film magnetic head of the embodiment is thus completed.

In this embodiment the top pole layer made up of the pole portion layer 31a, the magnetic layer 31b, the intermediate layer 31c, the magnetic layer 31d and the yoke portion layer 31e corresponds to the second magnetic layer of the invention.

Figure 29:
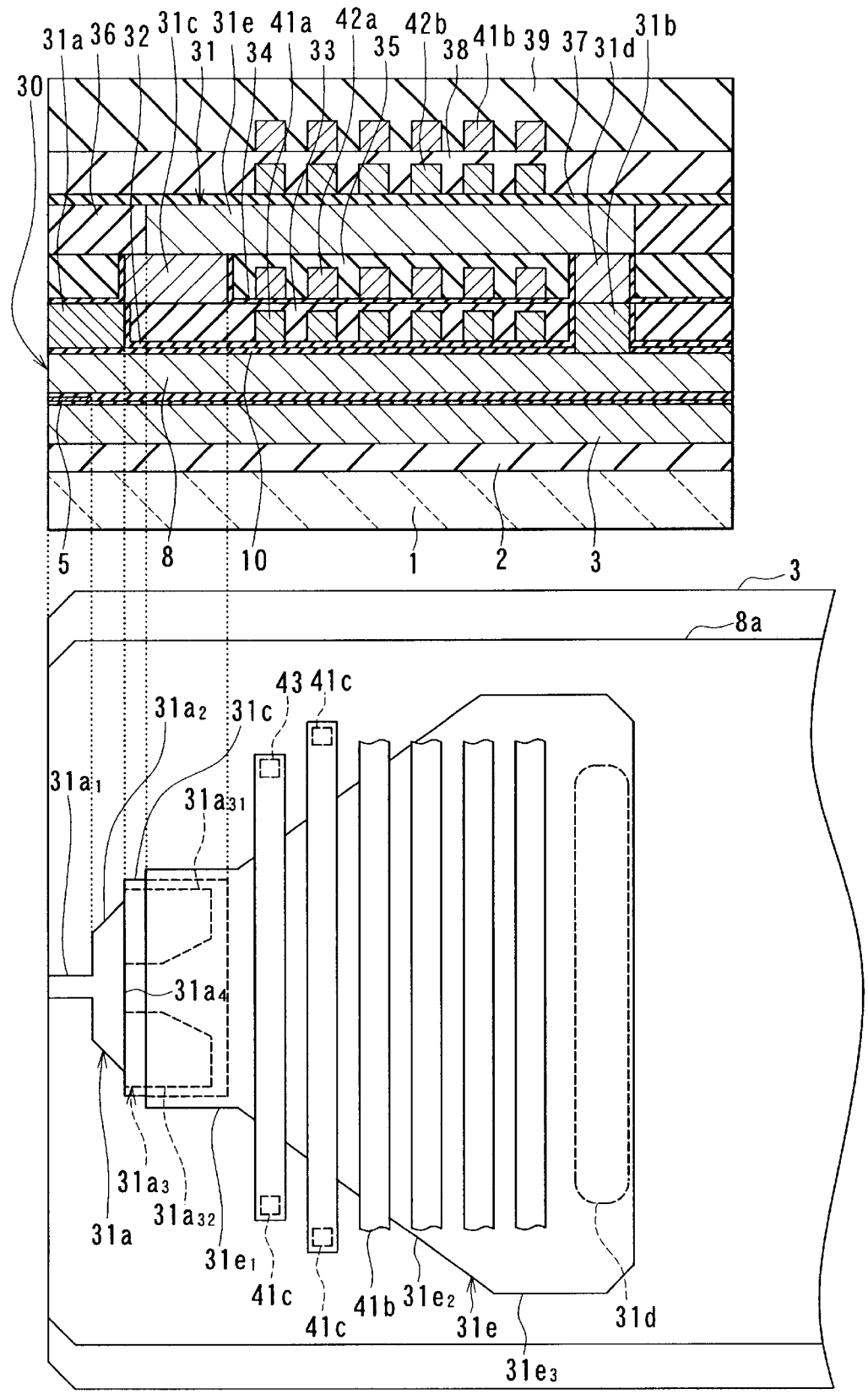
FIG. 29 is an explanatory view for illustrating the relationship between a cross-sectional view of the thin-film magnetic head of the ninth embodiment and a top view of the main part of the head.

FIG. 29 is an explanatory view for illustrating the relationship between a cross-sectional view (an upper view of FIG. 29) of the thin-film magnetic head of the embodiment and a top view (a lower view of FIG. 29) of the main part of the head.

In this embodiment the first layer 41a and the second layer 41b of the first portion of the coil are coupled to each other through the coupling portions 41c shown in FIG. 29 in a zigzag manner. The first portion of the coil is thereby wound around the yoke portion layer 31e of the top pole layer 31 in a helical manner. Similarly, the first layer 42a and the second layer 42b of the second portion of the coil are coupled to each other through the coupling portions (not shown) in a zigzag manner. The second portion of the coil is thereby wound around the yoke portion layer 31e of the top pole layer 31 in a helical manner.

The second layer 41b of the first portion of the coil and the first layer 42a of the second portion of the coil are coupled to each other through a coupling portion 43 shown in FIG. 29. The coupling portion 43 is made of a contact hole filled with the material of the thin-film coil, the contact hole penetrating the insulating layer 38, the insulating film 37, and the insulating layer 35 and reaching the first layer 42a of the second portion of the coil.

The first and second portions of the coil are wound such that these portions generate magnetic fields in one direction when an electric current is supplied in a specific direction.

As shown in FIG. 28A, FIG. 28B and FIG. 29, the first layer 41a of the first portion of the coil is located on a side of the pole portion layer 31a of the top pole layer 31. The first layer 42a of the second portion of the coil is located on a side of the intermediate layer 31c of the top pole layer 31.

As shown in FIG. 29, the pole portion layer 31a of the top pole layer 31 has: a track portion 31a, that defines the track width; a contact portion $31a_3$ that is in contact with the intermediate layer 31c; and a coupling portion $31a_2$ that couples the track portion $31a_1$ to the contact portion $31a_3$. The contact portion $31a_3$ includes two branch portions $31a_{31}$ and $31a_{32}$ that branch off from the coupling portion $31a_2$. The coupling portion $31a_2$ has an end located between the branch portions $31a_{31}$ and $31a_{32}$ and located farther from the air bearing surface 30. This end is a throat height defining end $31a_4$.

The intermediate layer 31c of the top pole layer 31 has a plane geometry of a quadrangle having a constant width nearly equal to the entire width of the contact portion $31a_3$. The intermediate layer 31c is located on top of the contact portion $31a_3$ and in contact with the contact portion $31a_3$.

The yoke portion layer 31e of the top pole layer 31 has a first portion $31e_1$, a second portion $31e_2$ and a third portion $31e_3$ in the order in which the closest to the air bearing surface 30 comes first. The first portion $31e_1$ has a constant width nearly equal to the width of the intermediate layer 31c. The third portion $31e_3$ has a constant width greater than the width of the first portion $31e_1$. The width of the second portion $31e_2$ gradually decreases from the width of the third portion $31e_3$ to the width of the first portion $31e_1$ as the distance from the air bearing surface 30 decreases. The second portion $31e_2$ has edges located at ends of the width thereof wherein the width varies. It is preferred that each of these edges forms an angle of 30 to 60 degrees with respect to the direction orthogonal to the air bearing surface 30.

The first portion $31e_1$ of the yoke portion layer 31e is located on top of the intermediate layer 31c and in contact with the intermediate layer 31c. The contact portion $31a_3$ of the pole portion layer 31a is in indirect contact with the yoke portion layer 31e through the intermediate layer 31c.

In this embodiment the thin-film coil is wound doubly around the top pole layer 31 in a helical manner. As a result, the magnetomotive force generated by the coil is greater, compared to the first embodiment. It is therefore possible to improve NLTS and the overwrite property.

In the embodiment the first layer 41a of the first portion of the coil is placed on the side of the pole portion layer 31a of the top pole layer 31, and the top surface (the surface facing toward the intermediate layer 31c) of the insulating layer 33 that covers the first layer 41a is flattened. As a result, the intermediate layer 31c of the top pole layer 31 and the first layer 42a of the second portion of the coil is formed on the flat surface with accuracy.

According to the embodiment, the first layer 42a of the second portion of the coil is placed on the side of the intermediate layer 31c of the top pole layer 31, and the top surface (the surface facing toward the yoke portion layer 31e) of the insulating layer 35 that covers the first layer 42a is flattened. As a result, the yoke portion layer 31e of the top pole layer 31 is formed on the flat surface.

According to the embodiment, an end face of each of the intermediate layer 31c and the yoke portion layer 31e facing toward the air bearing surface 30 is located at a distance from the air bearing surface 30. Side write and side erase are thereby prevented.

In the embodiment the pole portion layer 31a of the top pole layer 31 has the track portion $31a_1$ the coupling portion $31a_2$ and the contact portion $31a_3$. The contact portion $31a_3$ includes the two branch portions $31a_{31}$ and $31a_{32}$. The coupling portion $31a_2$ has the end $31a_4$ located between the branch portions $31a_{31}$ and $31a_{32}$ and located farther from the air bearing surface 30. The end $31a_4$ defines the throat height.

As a result, according to the embodiment, the contact portion $31a_3$ allows the pole portion layer 31a and the intermediate layer 31c to be in contact with each other, while maintaining a sufficient contact area, even in the position farther from the air bearing surface 30 than the zero throat height position. Therefore, it is possible to prevent side write and side erase by locating an end face of each of the intermediate layer 31c and the yoke portion layer 31e facing toward the air bearing surface 30 at a distance from the air bearing surface 30, and to prevent an abrupt reduction in the cross-sectional area of the magnetic path in the top pole layer 31 so as to prevent saturation in the magnetic flux halfway through the magnetic path. Furthermore, according to the embodiment, the throat height is defined by the end $31a_4$, that is, an end of the coupling portion $31a_2$ located between the branch portions $31a_{31}$ and $31a_{32}$ and located farther from the air bearing surface 30. It is therefore impossible that the existence of the contact portion $31a_3$ causes an increase in the throat height.

The remainder of the configuration, functions and effects of the ninth embodiment are similar to those of the first embodiment.

[Tenth Embodiment]

Figure 30:
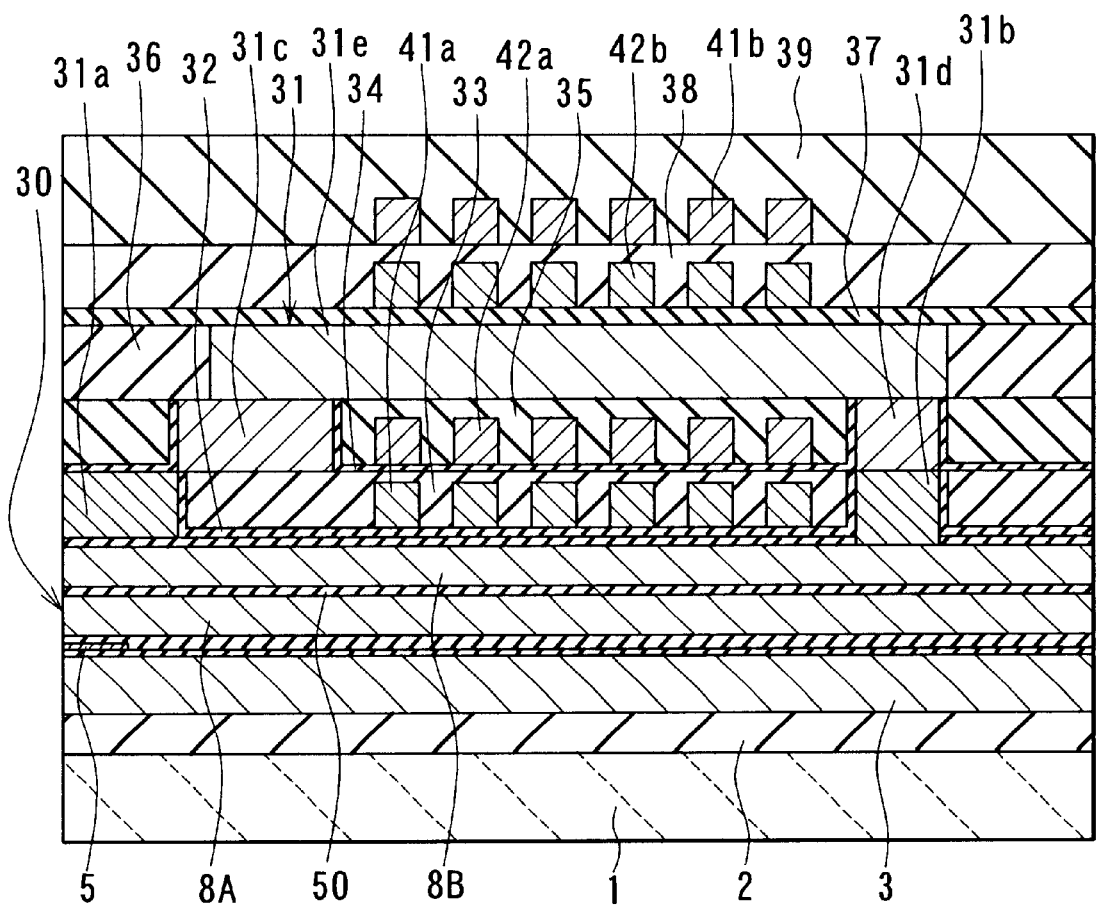
FIG. 30 is a cross section of a thin-film magnetic head of a tenth embodiment of the invention.

Reference is now made to FIG. 30 to describe a thin-film magnetic head and a method of manufacturing the same of a tenth embodiment of the invention. FIG. 30 is a cross section of the head orthogonal to an air bearing surface.

The thin-film magnetic head of the tenth embodiment comprises the bottom pole layer 8 similar to that of the thin-film magnetic head of the ninth embodiment except that the bottom pole layer 8 is divided into a top shield layer 8A and a bottom pole layer 8B. An insulating layer 50 of alumina, for example, having a thickness of 0.1 to 0.2 μm, for example, is formed between the top shield layer 8A and the bottom pole layer 8B. In the manufacturing method of this embodiment, the top shield layer 8A of a magnetic material is formed on the top shield gap film 7 on which the insulating layer 50 is formed. The bottom pole layer 8B of a magnetic material is then formed on the insulating layer 50.

According to the embodiment, the top shield layer 8A of the reproducing head and the bottom pole layer 8B of the recording head are separated by the insulating layer 50. As a result, it is possible to prevent residual magnetism in the recording head from affecting the reproducing head as a noise affecting the MR element 5 of the reproducing head. This effect is remarkable when the MR element 5 is a GMR element that produces a high output, in particular.

The remainder of the configuration, functions and effects of the tenth embodiment are similar to those of the ninth embodiment.

[Eleventh Embodiment]

Figure 31:
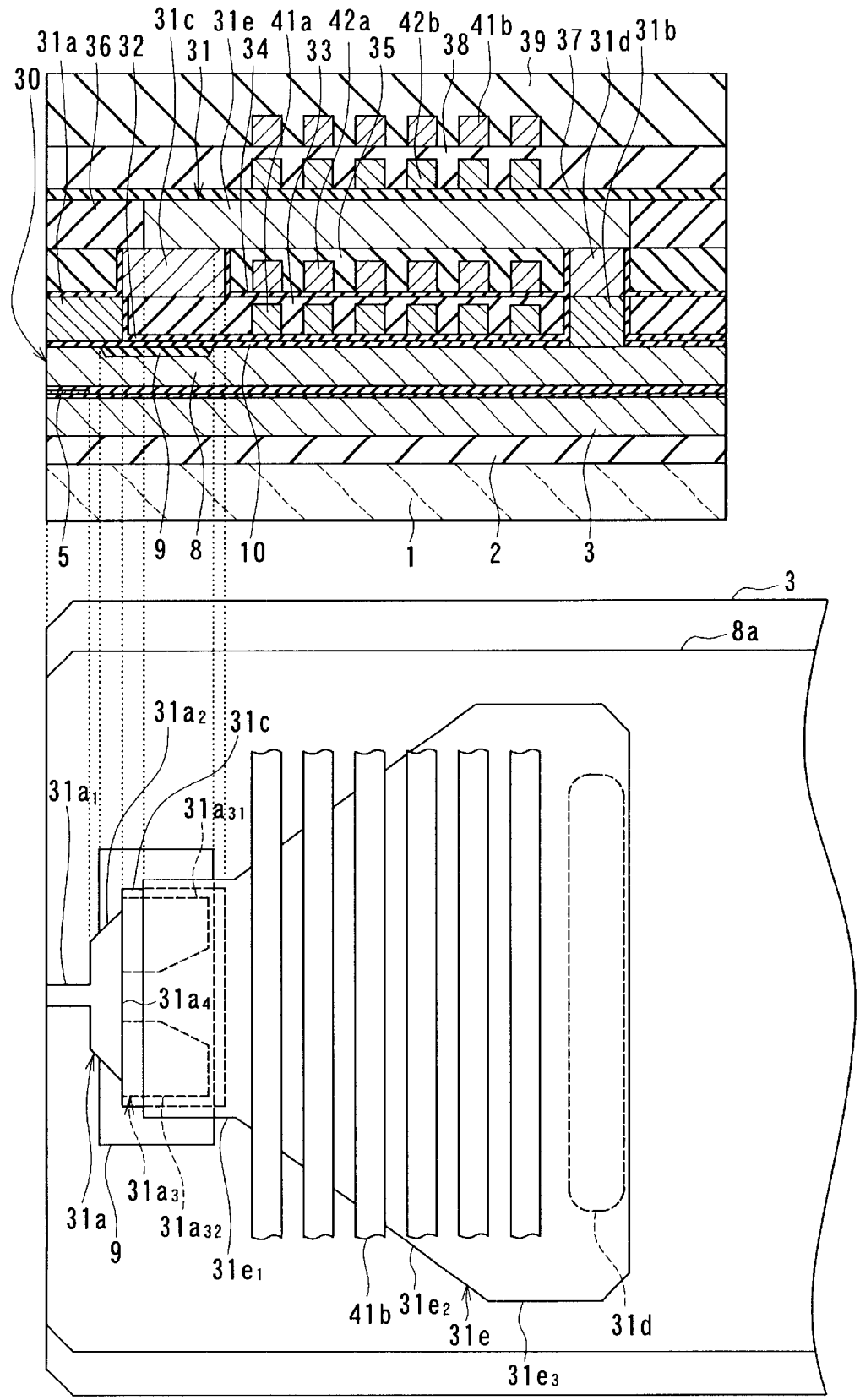
FIG. 31 is an explanatory view for illustrating the relationship between a cross-sectional view of the thin-film magnetic head of an eleventh embodiment of the invention and a top view of the main part of the head.
Figures 42A, 42B:
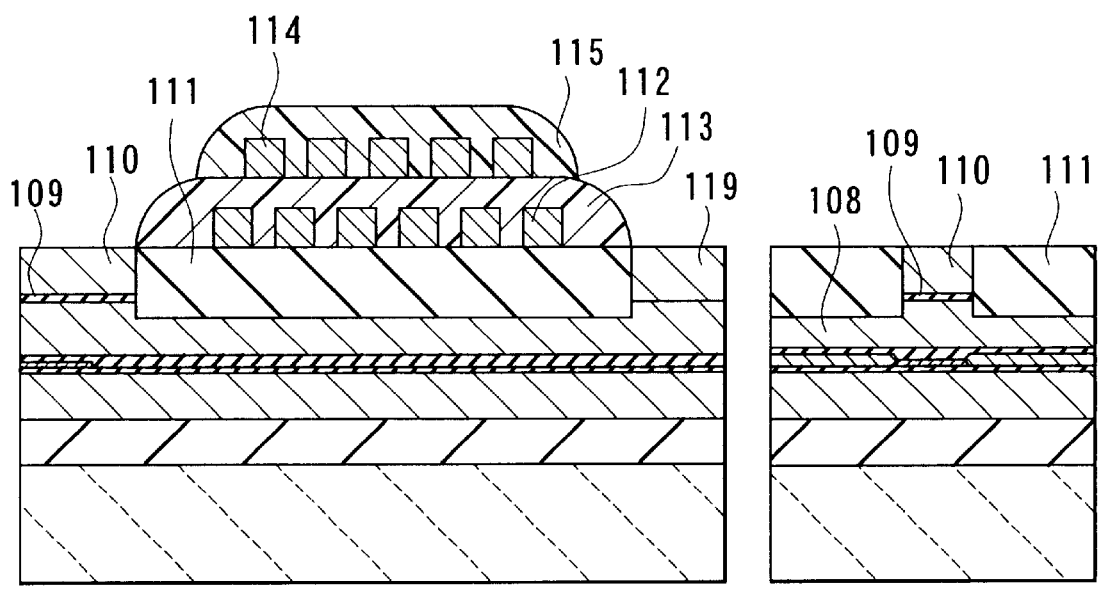
FIG. 42A and FIG. 42B are cross sections for illustrating a step that follows FIG. 41A and FIG. 41B.
Figures 43A, 43B:
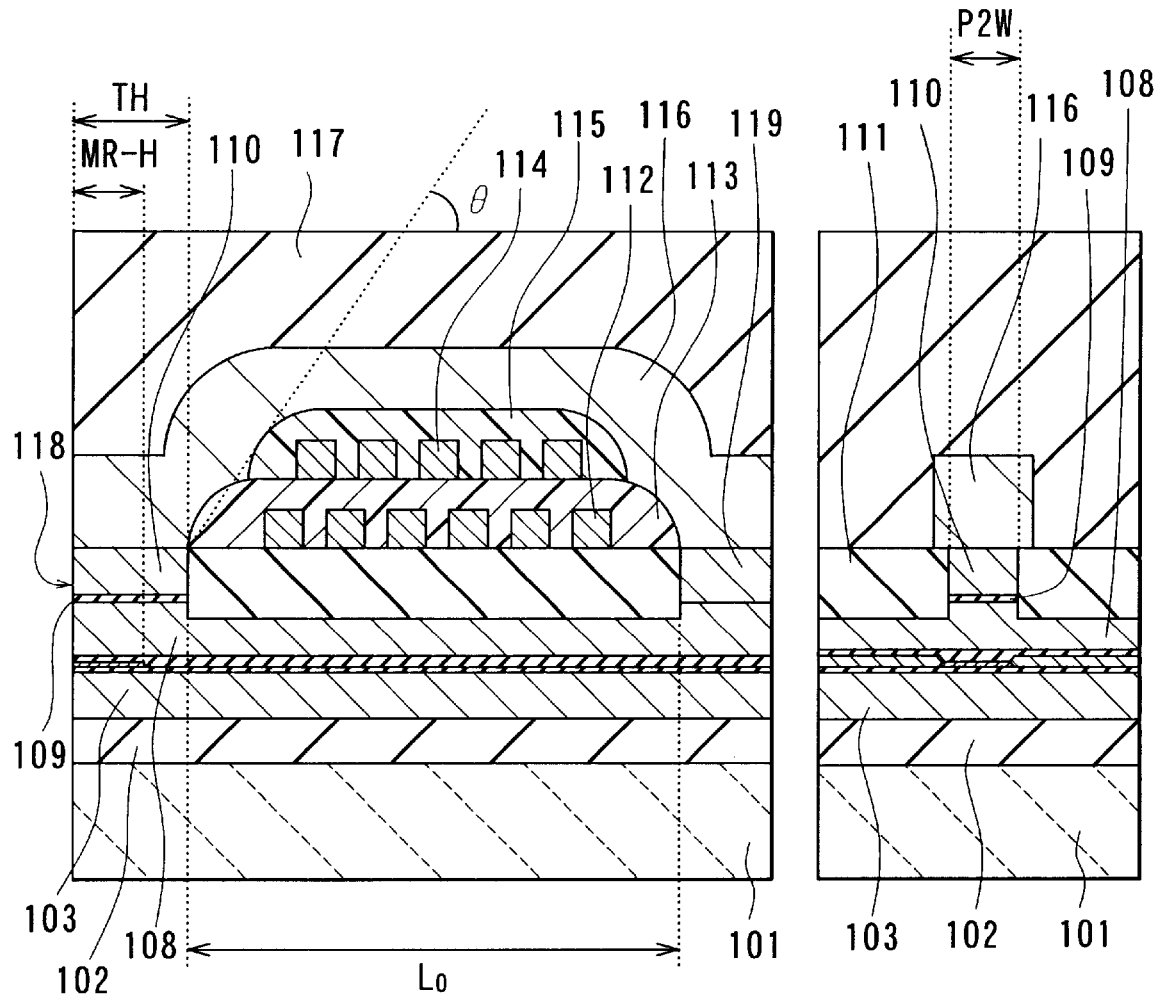
FIG. 43A and FIG. 43B are cross sections for illustrating a step that follows FIG. 42A and FIG. 42B.
Figure 44:
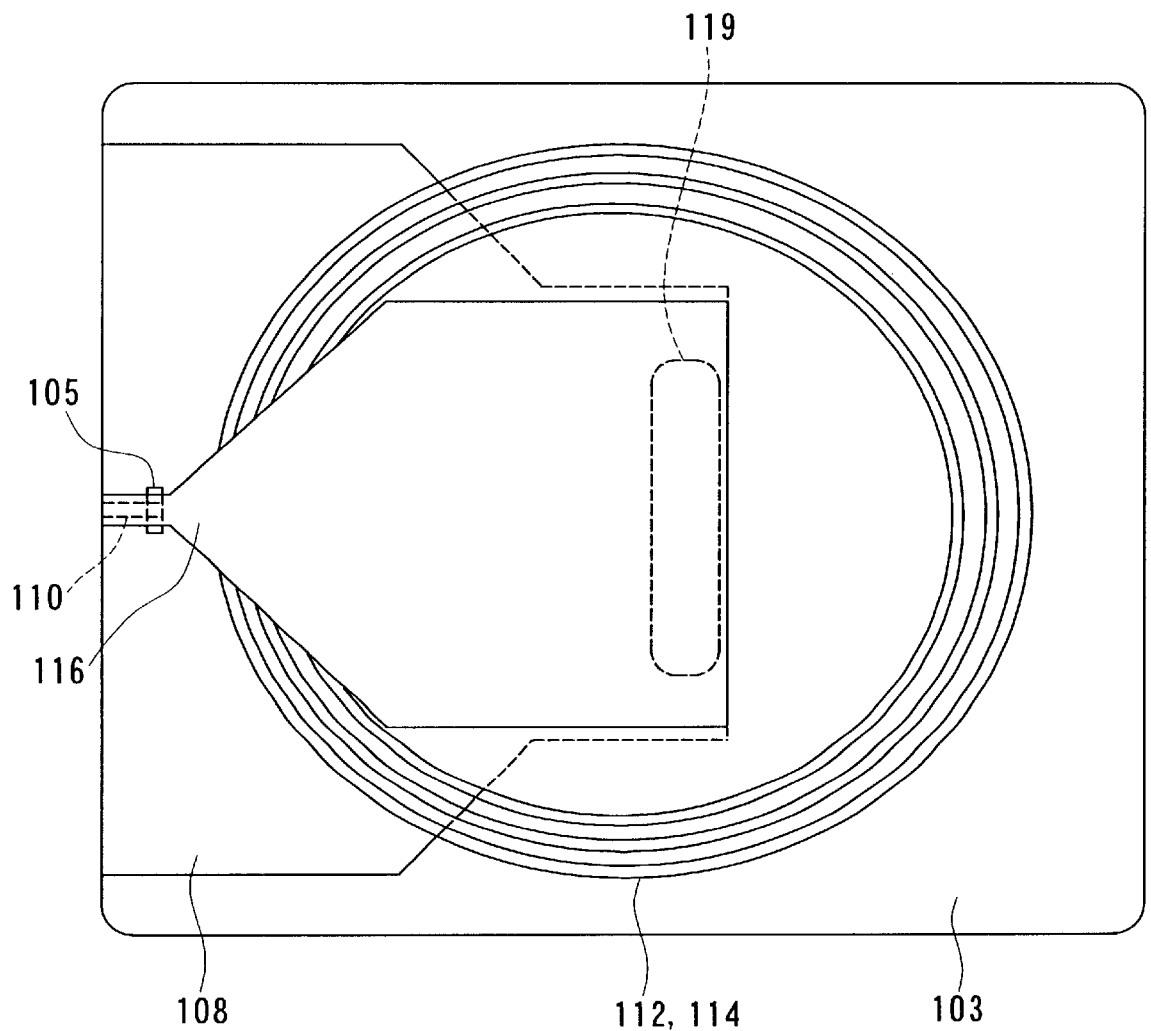
FIG. 44 is a top view of the related-art thin-film magnetic head.

Reference is now made to FIG. 31 to describe a thin-film magnetic head and a method of manufacturing the same of a eleventh embodiment of the invention. FIG. 31 is an explanatory view for illustrating the relationship between a cross-sectional view (an upper view of FIG. 31) of the thin-film magnetic head of the embodiment and a top view (a lower view of FIG. 31) of the main part of the head.

The thin-film magnetic head of the eleventh embodiment comprises the bottom pole layer 8 similar to that of the thin-film magnetic head of the ninth embodiment except that a concavity is formed in a specific region of the top surface of the bottom pole layer 8. The insulating layer 9 as the flux blocking layer is embedded in this concavity. The insulating layer 9 is located between the bottom pole layer 8 and the contact portion $31a_3$ of the pole portion layer 31a of the top pole layer 31. Between the bottom pole layer 8 and the contact portion $31a_3$, the insulating layer 9 blocks the passage of a magnetic flux that does not pass through the magnetic layers 8 and 31.

The remainder of the configuration, functions and effects of the eleventh embodiment are similar to those of the ninth embodiment.

[Twelfth Embodiment]

Reference is now made to FIG. 32A to FIG. 39A and FIG. 32B to FIG. 39B to describe a thin-film magnetic head and a method of manufacturing the same of a twelfth embodiment of the invention. FIG. 32A to FIG. 39A are cross sections each orthogonal to an air bearing surface. FIG. 32B to FIG. 39B are cross sections of the pole portion each parallel to the air bearing surface.

The thin-film magnetic head of the twelfth embodiment comprises a thin-film coil wound doubly around the top pole layer in a helical manner. In this embodiment an outer portion of the coil is called a first portion and an inner portion is called a second portion. Each of the first and second portions of the coil may be made of copper, for example.

The steps of the method of manufacturing the thin-film magnetic head of the twelfth embodiment that are taken until the top shield gap film 7 is formed are similar to those of the first embodiment.

Next, as shown in FIG. 32A and FIG. 32B, a yoke portion layer 58a of a top-shield layer-cum-bottom-pole-layer (called a bottom pole layer in the following description) 58 is selectively formed on the top shield gap film 7. The bottom pole layer 58 is used for both a reproducing head and a recording head. The yoke portion layer 58a is made of a magnetic material and has a thickness of about 1 to 2 μm. The bottom pole layer 58 is made up of a pole portion layer 58b and a magnetic layer 58c described later, in addition to the yoke portion layer 58a. The yoke portion layer 58a is located to face at least a part of a thin-film coil described later.

Next, as shown in FIG. 33A and FIG. 33B, the pole portion layer 58b and the magnetic layer 58c of the bottom pole layer 58, each having a thickness of about 1.5 to 2.5 μm, are formed on the yoke portion layer 58a. The pole portion layer 58b includes a portion that makes up a pole portion of the bottom pole layer 58 and is connected to a surface of the yoke portion layer 58a that faces toward the thin-film coil (on the upper side of the drawings). The magnetic layer 58c is provided for connecting the yoke portion layer 58a to a top pole layer described later.

The pole portion layer 58b and the magnetic layer 58c of the bottom pole layer 58 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering, and then selectively etched through ion milling, for example, and formed into the specific shapes. Alternatively, a material such as CoFe or a Co-base amorphous material as a high saturation flux density material may be used.

Next, as shown in FIG. 34A and FIG. 34B, an insulating film 59 of alumina, for example, having a thickness of about 0.3 to 0.6 μm is formed over the entire surface.

Next, on a portion of the insulating film 59 between the pole portion layer 58b and the magnetic layer 58c, a first layer 71a of the first portion of the thin-film coil is formed by frame plating. For example, the thickness of the first layer 71a is 1 to 2 μm. The first portion of the thin-film coil 13 is made up of the first layer 71a, a second layer 71b described later and a coupling portion not shown. The first layer 71a is located on a side of the pole portion layer 58b of the bottom pole layer 58 (that is, on the right side of FIG. 34A). The first layer 71a is made up of a plurality of square-prism-shaped portions extending in the direction intersecting the drawing sheet of FIG. 34A.

Next, as shown in FIG. 35A and FIG. 35B, an insulating layer 60 of alumina, for example, having a thickness of about 3 to 4 μm is formed over the entire surface. The insulating layer 60 is then polished through CMP, for example, until the pole portion layer 58b and the magnetic layer 58c of the bottom pole layer 58 are exposed, and the surface is flattened. Although the first layer 71a of the first portion of the coil is not exposed in FIG. 35A, the first layer 71a may be exposed.

Next, as shown in FIG. 36A and FIG. 36B, the recording gap layer 10 whose thickness is 0.15 to 0.3 μm, for example, is formed on the pole portion layer 58b and the magnetic layer 58c of the bottom pole layer 58, and the insulating layer 60. Next, a portion of the recording gap layer 10 located on top of the magnetic layer 58c is etched to form a contact hole for making the magnetic path.

Next, on the recording gap layer 10, the pole portion layer 11a of the top pole layer 11 is formed. The pole portion layer 11a has a thickness of 2 to 4 μm for example. At the same time, the magnetic layer 11b having a thickness of 2 to 4 μm is fabricated in the contact hole formed in the portion on top of the magnetic layer 58c.

Next, the recording gap layer 10 is selectively etched through dry etching, using the pole portion layer 11a of the top pole layer 11 as a mask. Next, the pole portion layer 58b of the bottom pole layer 58 is selectively etched by a depth of only 0.2 to 0.5 μm, for example, through argon ion milling, for example. A trim structure as shown in FIG. 36B is thus formed.

Next, an insulating film 62 of alumina, for example, is formed over the entire surface. The thickness of the insulating film 62 is about 0.3 to 0.6 μm.

Next, on a portion of the insulating film 62 between the pole portion layer 11a and the magnetic layer 11b, a first layer 72a of the second portion of the thin-film coil is formed by frame plating. For example, the thickness of the first layer 72a is 1 to 2 μm. The second portion of the thin-film coil is made up of the first layer 72a, a second layer 72b described later and a coupling portion not shown. The first layer 72a is located on a side of the pole portion layer 11a of the top pole layer 11 (that is, on the right side of FIG. 36A). The first layer 72a is made up of a plurality of square-prism-shaped portions extending in the direction intersecting the drawing sheet of FIG. 36A.

Next, as shown in FIG. 37A and FIG. 37B, an insulating layer 63 of alumina, for example, having a thickness of about 3 to 4 μm is formed over the entire surface. The insulating layer 63 is then polished through CMP, for example, until the pole portion layer 11a and the magnetic layer 11b of the top pole layer 11 are exposed, and the surface is flattened.

Next, as shown in FIG. 38A and FIG. 38B, the yoke portion layer 11c having a thickness of 2 to 3 μm, for example, is formed on the pole portion layer 11a and the magnetic layer 11b of the top pole layer 11 flattened and the insulating layer 63. The yoke portion layer 11c is in contact with and magnetically coupled to the magnetic layer 58c of the bottom pole layer 58 through the magnetic layer 11b. An end face of the yoke portion layer 11c facing toward the air bearing surface 30 is located at a distance from the air bearing surface 30 (that is, on the right side of FIG. 38A).

Next, an insulating layer 64 of alumina, for example, having a thickness of about 3 to 4 μm is formed over the entire surface. The insulating layer 64 is then polished through CMP, for example, so that the yoke portion layer 11c of the top pole layer 11 is exposed, and the surface is flattened.

Next, as shown in FIG. 39A and FIG. 39B, an insulating film 65 of alumina, for example, having a thickness of about 0.3 to 0.5 μm is formed over the entire surface.

Next, although not shown, contact holes are formed through RIE or ion milling, for example, in portions on top of both ends of each of the square-prism-shaped portions of the first layer 72a of the second portion of the coil. Those contact holes penetrate the insulating film 65 and the insulating layer 63, and reach the first layer 72a.

Next, a second layer 72b of the second portion of the thin-film coil is formed by frame plating on a portion of the insulating film 65 located on top of the yoke portion layer 11c of the top pole layer 11. For example, the thickness of the second layer 72b is 1 to 2 μm. The second layer 72b is made up of a plurality of square-prism-shaped portions extending in the direction orthogonal to the drawing sheet of FIG. 39A. Both ends of each of the square-prism-shaped portions of the second layer 72b are connected to both ends of each of the square-prism-shaped portions of the first layer 72a through coupling portions made of the above-described contact holes filled with the material of the thin-film coil.

Next, an insulating layer 66 of alumina, for example, having a thickness of about 3 to 4 μm is formed over the entire surface. The surface of the insulating layer 66 is then flattened.

Next, although not shown, contact holes are formed through RIE or ion milling, for example, in portions on top of both ends of each of the square-prism-shaped portions of the first layer 71a of the first portion of the coil. Those contact holes penetrate the insulating layer 66, the insulating film 65, the recording gap layer 10 and the insulating layer 60, and reach the first layer 71a.

Next, a second layer 71b of the first portion of the thin-film coil is formed by frame plating on the insulating layer 66. For example, the thickness of the second layer 71b is 1 to 2 μm. The second layer 71b is made up of a plurality of square-prism-shaped portions extending in the direction orthogonal to the drawing sheet of FIG. 39A. Both ends of each of the square-prism-shaped portions of the second layer 71b are connected to both ends of each of the square-prism-shaped portions of the first layer 71a of the first portion of the coil through coupling portions made of the above-described contact holes filled with the material of the thin-film coil.

Next, an overcoat layer 67 of alumina, for example, having a thickness of 20 to 40 μm, for example, is formed over the entire surface. The surface of the overcoat layer 67 is then flattened and pads (not shown) for electrodes are formed on the overcoat layer 67. Finally, lapping of the slider is performed to form the air bearing surface 30 of the thin-film magnetic head including the recording head and the reproducing head. The thin-film magnetic head of the embodiment is thus completed.

In this embodiment the bottom pole layer made up of the yoke portion layer 58a, the pole portion layer 58b and the magnetic layer 58c corresponds to the first magnetic layer of the invention.

In this embodiment the first layer 71a and the second layer 71b of the first portion of the coil are coupled to each other through the coupling portions (not shown) in a zigzag manner, as in the ninth embodiment. The first portion of the coil is thereby wound around the yoke portion layer 11c of the top pole layer 11 in a helical manner. Similarly, the first layer 72a and the second layer 72b of the second portion of the coil are coupled to each other through the coupling portions (not shown) in a zigzag manner. The second portion of the coil is thereby wound around the yoke portion layer 11c of the top pole layer 11 in a helical manner, too.

As in the ninth embodiment the second layer 71b of the first portion of the coil and the first layer 72a of the second portion of the coil are coupled to each other through a coupling portion (not shown). This coupling portion is made of a contact hole filled with the material of the thin-film coil, the contact hole penetrating the insulating layer 66, the insulating film 65, and the insulating layer 63 and reaching the first layer 72a of the second portion of the coil.

The first and second portions of the coil are wound such that these portions generate magnetic fields in one direction when an electric current is supplied in a specific direction.

According to the embodiment, the first layer 71a of the first portion of the coil is located on a side of the pole portion layer 58b of the bottom pole layer 58, and the top surface (the surface facing toward the recording gap layer 10) of the insulating layer 60 that covers the first layer 71a is flattened. As a result, the pole portion layer 11a of the top pole layer 11 is formed on the flat surface with accuracy.

According to the embodiment, the first layer 72a of the second portion of the coil is placed on the side of the pole portion layer 11a of the top pole layer 11, and the top surface (the surface facing toward the yoke portion layer 11c) of the insulating layer 63 that covers the pole portion layer 11a is flattened. As a result, the yoke portion layer 11c of the top pole layer 11 is formed on the flat surface with accuracy.

The remainder of the configuration, functions and effects of the twelfth embodiment are similar to those of the first or ninth embodiment.

The present invention is not limited to the foregoing embodiments but ay be practiced in still other ways. For example, although the contact portion of the pole portion layer includes the two branch portions in the foregoing embodiments, the contact portion may include three branch portions or more.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head comprising an induction-type magnetic transducer only and used for writing only, or may be applied to a thin-film magnetic head performing writing and reading through an induction-type magnetic transducer.

According to the first thin-film magnetic head or the method of manufacturing the same of the invention described so far, the thin-film coil is wound around at least one of the magnetic layers in a helical manner, and a portion of the coil passes between the first and second magnetic layers. In addition, the portion of the coil is placed on a side of the pole portion layer of one of the magnetic layers. As a result, a reduction in the yoke length is achieved. According to the invention, the pole portion layer is formed on the flat surface, and it is thereby possible to define the track width and the throat height with accuracy. According to the invention, an end face of the yoke portion layer of the one of the magnetic layers facing toward the medium facing surface is located at a distance from the medium facing surface. The contact portion of the pole portion layer includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

According to the first thin-film magnetic head or the method of manufacturing the same of the invention, the insulating layer may be further provided. This insulating layer covers the part of the coil located on the side of the pole portion layer, the insulating layer having a surface that faces the yoke portion layer and is flattened. In this case, it is further possible to form the yoke portion layer on the flat surface with accuracy.

According to the first thin-film magnetic head or the method of manufacturing the same of the invention, the flux blocking layer may be further provided for blocking the passage of a magnetic flux, the flux blocking layer being located between the contact portion of the pole portion layer and the other of the magnetic layers. In this case, it is possible to prevent a magnetic flux from passing between the contact portion and the other of the magnetic layers without passing through the magnetic layers.

According to the second thin-film magnetic head or the method of manufacturing the same of the invention, the thin-film coil is wound around at least one of the magnetic layers in a helical manner, and includes: the first portion a part of which is located on a side of the pole portion layer; and the second portion a part of which is located on a side of the intermediate layer. As a result, a reduction in the yoke length is achieved. Furthermore, the pole portion layer is formed on the flat surface, and it is thereby possible to define the track width and the throat height with accuracy. According to the invention, each of the intermediate layer and the yoke portion layer of one of the magnetic layers has an end face facing toward the medium facing surface, the end face being located at a distance from the medium facing surface. The contact portion of the pole portion layer includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

According to the second thin-film magnetic head or the method of manufacturing the same of the invention, the first and second insulating layers may be further provided. The first insulating layer covers the part of the first portion of the coil located on the side of the pole portion layer, the first insulating layer having a surface that faces the intermediate layer and is flattened. The second insulating layer covers the part of the second portion of the coil located on the side of the intermediate layer, the second insulating layer having a surface that faces the yoke portion layer and is flattened. In this case, it is further possible to form each of the intermediate layer and the yoke portion layer on the flat surface with accuracy.

According to the third thin-film magnetic head or the method of manufacturing the same of the invention, the thin-film coil is wound around at least one of the magnetic layers in a helical manner, and includes: the first portion a part of which is located on a side of the pole portion layer of the first magnetic layer; and the second portion a part of which is located on a side of the pole portion layer of the second magnetic layer. As a result, a reduction in the yoke length is achieved. Furthermore, the pole portion layer of one of the magnetic layers is formed on the flat surface, and it is thereby possible to define the track width and the throat height with accuracy. According to the invention, the yoke portion layer of one of the magnetic layers has an end face facing toward the medium facing surface, the end face being located at a distance from the medium facing surface. The contact portion of the pole portion layer of the one of the magnetic layers includes a plurality of branch portions that branch off from the coupling portion. The coupling portion has an end located between the branch portions and located farther from the medium facing surface. This end defines the throat height. As a result, it is possible to prevent writing of data in a region where data is not supposed to be written and to prevent a magnetic flux from saturating halfway through the magnetic path.

According to the third thin-film magnetic head or the method of manufacturing the same of the invention, the first and second insulating layers may be further provided. The first insulating layer covers the part of the first portion of the coil located on the side of the pole portion layer of the first magnetic layer, the first insulating layer having a surface that faces the gap layer and is flattened. The second insulating layer covers the part of the second portion of the coil located on the side of the pole portion layer of the second magnetic layer, the second insulating layer having a surface that faces the yoke portion layer and is flattened. In this case, it is further possible to form each of the pole portion layer and the yoke portion layer of the second magnetic layer on the flat surface with accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a first magnetic layer and a second magnetic layer magnetically coupled to each other and including magnetic pole portions opposed to each other and placed in regions on a side of the medium facing surface, each of the magnetic layers including at least one layer;
   a gap layer provided between the pole portions of the first and second magnetic layers; and
   a thin-film coil wound around at least one of the magnetic layers in a helical manner and insulated from the first and second magnetic layers, a part of the coil passing between the first and second magnetic layers; wherein:
   one of the magnetic layers includes: a pole portion layer having a surface adjacent to the gap layer and including one of the pole portions; and a yoke portion layer connected to the other surface of the pole portion layer and making up a yoke portion;
   the part of the coil is located on a side of the pole portion layer;
   the yoke portion layer has an end face facing toward the medium facing surface, the end face being located at a distance from the medium facing surface; and
   the pole portion layer includes: a track portion that defines a track width; a contact portion that is in indirect or indirect contact with the yoke portion layer; and a coupling portion that couples the track portion and the contact portion to each other; the contact portion including a plurality of branch portions that branch off from the coupling portion; the coupling portion having an end located between the branch portions and located opposite to the medium facing surface, the end defining a throat height.

2. The thin-film magnetic head according to claim 1, further comprising an insulating layer that covers the part of the coil located on the side of the pole portion layer, the insulating layer having a surface that faces the yoke portion layer and is flattened.

3. The thin-film magnetic head according to claim 1, further comprising a flux blocking layer for blocking the passage of a magnetic flux, the flux blocking layer being located between the contact portion of the pole portion layer and the other of the magnetic layers.

4. A thin-film magnetic head comprising:
   a medium facing surface that faces toward a recording medium;
   a first magnetic layer and a second magnetic layer magnetically coupled to each other and including magnetic pole portions opposed to each other and placed in regions on a side of the medium facing surface, each of the magnetic layers including at least one layer;
   a gap layer provided between the pole portions of the first and second magnetic layers; and
   a thin-film coil wound around at least one of the magnetic layers in a helical manner and insulated from the first and second magnetic layers, a part of the coil passing between the first and second magnetic layers; wherein:
   one of the magnetic layers includes: a pole portion layer having a surface adjacent to the gap layer and including one of the pole portions; a yoke portion layer making up a yoke portion; and an intermediate layer having a surface connected to the other surface of the pole portion layer, and the other surface connected to the yoke portion layer;
   the thin-film coil includes: a first portion a part of which is located on a side of the pole portion layer; and a second portion a part of which is located on a side of the intermediate layer;
   each of the intermediate layer and the yoke portion layer has an end face facing toward the medium facing surface, the end face being located at a distance from the medium facing surface; and
   the pole portion layer includes: a track portion that defines a track width; a contact portion that is in contact with the intermediate layer; and a coupling portion that couples the track portion and the contact portion to each other; the contact portion including a plurality of branch portions that branch off from the coupling portion; the coupling portion having an end located between the branch portions and located opposite to the medium facing surface, the end defining a throat height.

5. The thin-film magnetic head according to claim 4, further comprising: a first insulating layer that covers the part of the first portion of the coil located on the side of the pole portion layer, the first insulating layer having a surface that faces the intermediate layer and is flattened; and a second insulating layer that covers the part of the second portion of the coil located on the side of the intermediate layer, the second insulating layer having a surface that faces the yoke portion layer and is flattened.

6. A thin-film magnetic head comprising:
   a medium facing surface that faces toward a recording medium;
   a first magnetic layer and a second magnetic layer magnetically coupled to each other and including magnetic pole portions opposed to each other and placed in regions on a side of the medium facing surface, each of the magnetic layers including at least one layer;
   a gap layer provided between the pole portions of the first and second magnetic layers; and
   a thin-film coil wound around at least one of the magnetic layers in a helical manner and insulated from the first and second magnetic layers, a part of the coil passing between the first and second magnetic layers; wherein:
   each of the first and second magnetic layers includes: a pole portion layer having a surface adjacent to the gap layer and including one of the pole portions; and a yoke portion layer connected to the other surface of the pole portion layer and making up a yoke portion;
   the thin-film coil includes: a first portion a part of which is located on a side of the pole portion layer of the first magnetic layer; and a second portion a part of which is located on a side of the pole portion layer of the second magnetic layer;
   the yoke portion layer of one of the magnetic layers has an end face facing toward the medium facing surface, the end face being located at a distance from the medium facing surface; and
   the pole portion layer of the one of the magnetic layers includes: a track portion that defines a track width; a contact portion that is in contact with the yoke portion layer; and a coupling portion that couples the track portion and the contact portion to each other; the contact portion including a plurality of branch portions that branch off from the coupling portion; the coupling portion having an end located between the branch portions and located opposite to the medium facing surface, the end defining a throat height.

7. The thin-film magnetic head according to claim 6, further comprising: a first insulating layer that covers the part of the first portion of the coil located on the side of the pole portion layer of the first magnetic layer, the first insulating layer having a surface that faces the gap layer and is flattened; and a second insulating layer that covers the part of the second portion of the coil located on the side of the pole portion layer of the second magnetic layer, the second insulating layer having a surface that faces the yoke portion layer and is flattened.

* * * * *

UNITED STATES PATENT AND TRADEMARK OFFICE
CERTIFICATE OF CORRECTION

PATENT NO. : 6,459,543 B1
DATED : October 1, 2002
INVENTOR(S) : Yoshitaka Sasaki It is certified that error appears in the above-identified patent and that said Letters Patent is hereby corrected as shown below:

Column 8,
Line 51, after "steps of" please insert -- : --;

Column 9,
Line 23, after "formation of" please insert -- : --;
Line 43, after "steps of" please insert -- : --;

Column 12,
Line 58, please remove "(Al(CH))" replace with -- $(Al(CH_3)_3)$ --;

Column 24,
Line 29, after "layer" please insert -- 31b --;

Column 28,
Line 18, after "$31a_1$" please insert -- , --;

Column 32,
Line 61, remove "ay" replace with -- may --;

Column 35,
Line 31, remove "indirect" replace with -- in direct --.

Signed and Sealed this

Twenty-fifth Day of February, 2003

JAMES E. ROGAN
*Director of the United States Patent and Trademark Office*